INVENTORS
R.M. Kiehn, R.E. Peterson
L.D.P. King, E.O. Swickard, Jr.

June 26, 1962  R. M. KIEHN ETAL  3,041,263
MOLTEN PLUTONIUM FUELED FAST BREEDER REACTOR
Filed Dec. 5, 1957  15 Sheets-Sheet 5

WITNESSES:

INVENTOR.
R.M. Kiehn, R.E. Peterson
L.D.P. King, E.O. Swickard, Jr.
BY

June 26, 1962  R. M. KIEHN ETAL  3,041,263
MOLTEN PLUTONIUM FUELED FAST BREEDER REACTOR
Filed Dec. 5, 1957  15 Sheets-Sheet 6

WITNESSES:

INVENTORS
R.M. Kiehn, R.E. Peterson
L.D.P. King, E.O. Swickard, Jr.
BY

June 26, 1962 R. M. KIEHN ETAL 3,041,263
MOLTEN PLUTONIUM FUELED FAST BREEDER REACTOR
Filed Dec. 5, 1957 15 Sheets-Sheet 7

WITNESSES:

INVENTORS
R.M. Kiehn, R.E. Peterson
L.D.P. King, E.O. Swickard, Jr.
BY

June 26, 1962 R. M. KIEHN ETAL 3,041,263
MOLTEN PLUTONIUM FUELED FAST BREEDER REACTOR
Filed Dec. 5, 1957 15 Sheets-Sheet 9

INVENTORS
R.M. Kiehn, R.E. Peterson
L.D.P. King, E.O. Swickard, Jr.
BY 3,041,263
MOLTEN PLUTONIUM FUELED FAST
BREEDER REACTOR
Robert M. Kiehn, L. D. Percival King, Rolf E. Peterson, and Earl O. Swickard, Jr., all of Los Alamos, N. Mex., assignors to the United States of America as represented by the United States Atomic Energy Commission
Filed Dec. 5, 1957, Ser. No. 700,918
12 Claims. (Cl. 204—193.2)

The present invention is directed to molten fuel reactors and more particularly to molten plutonium fueled fast breeder reactors.

The long-range utility of fission nuclear power depends upon the development of a plutonium fueled reactor capable of being refueled by an integral, or associated, breeding cycle. If full utilization of the energy content in the world's supply of uranium is to be accomplished, the more abundant $U^{238}$ must be converted into the easily fissionable isotopes of plutonium. The need for this full utilization is apparent when it is realized that the economically recoverable $U^{235}$ content of uranium ores is sufficient to supply projected world power requirements for only a few tens of years. Breeding on the plutonium cycle extends fission power capabilities by a factor of 140, yielding thousands, instead of tens, of years of world energy reserves.

The high values of the capture-to-fission ratio at thermal and epithermal neutron energies for the plutonium isotopes preclude these types of reactors from an integral plutonium breeding cycle system. To obtain an appreciable breeding gain, a plutonium fueled reactor must be either a fast, or a fast-intermediate, neutron spectrum device where breeding ratios of the order of 1.7 may be expected from suitably designed systems. The power producing reactor of the future must logically be a fast plutonium breeder.

A competitive power producing reactor must have the following characteristics: (1) a fuel which is easily processed and/or capable of withstanding large fractional burnups and (2) a large specific power (>500 w./g. of fuel). The latter requirement is essentially a measure of the fuel inventory for a fixed output machine and may not be applicable to special purpose reactors.

The use of a mobile fuel in a molten, or pseudo-molten, state best satisfies the first requirement above. The second requirement is strongly dependent upon the design of the reactor heat-exchange mechanism and may be met by either a high fuel dilution or an extremely efficient heat-transfer mechanism.

In order to maintain a fast-neutron spectrum, fuel densities in a plutonium breeder will be high, and coolants must be either molten metals or salts. The latter characteristic will permit large amounts of power to be extracted from relatively small volumes, thus obtaining a large figure of merit (specific power). Hydrogenous and organic coolants are eliminated because of their attendant neutron moderation properties, high vapor pressures at high temperatures, and relatively poor resistance to radiation damage. For efficiency reasons the system temperature should be as high as is compatible with a long operating life. Therefore, to be in step with modern electrical generation techniques, this would imply coolant outlet temperatures of the order of 650° C.

The reactor of the present invention is preferably a fast reactor fueled with molten plutonium containing about 20 kg. of plutonium in a tantalum container, cooled by circulating liquid sodium at about 600 to 650° C. The reactor has satisfactorily large negative temperature coefficients of reactivity and adequate control capacity.

Some nuclear reactors, in addition to providing a useful neutron or heat flux, provide a means for creating new active material or fuel within the reactor. These are known as breeder reactors. In a breeder reactor, the breeding ratio depends upon the excess of the number of neutrons born over the number lost in capture including fission, so that assuming no leakage:

$$R = \text{breeding ratio} = \frac{\nu - 1 - \alpha}{1 + \alpha} \quad (1)$$

where R must be greater than one for useful breeding, where $\nu$=average number of neutrons per fission, and $\alpha = \sigma_c/\sigma_f$, where $\sigma_c$=capture cross section, and $\sigma_f$=fission cross section.

When values are inserted in Equation 1, it can be seen that in a reactor operating with thermal neutrons, $U^{235}$ is suitable as a breeder fuel but $Pu^{239}$ is not. $\alpha$ for $U^{235}$ at thermal energies is low enough to provide a breeding ratio (R) greater than 1. However, at fast neutron energies, $Pu^{239}$ is suitable as a breeder fuel since $\alpha$ for $Pu^{239}$ is low enough to provide an $R>1$, and $U^{235}$ is not suitable.

Pure plutonium may be used in a non-breeder fast reactor. One of the difficulties of the use of pure plutonium in the form of solid fuel elements is that the plutonium is consumed during the operation of the reactor and therefore the fuel element must be replaced or reprocessed periodically as a certain percentage of the plutonium is "spent." Another difficulty to the use of pure plutonium in the form of a solid element or as a liquid is that all of the heat is generated in a small volume of material with attendant difficulties in heat extraction.

In order to reduce the intensity of heat generation in the plutonium, diluents may be used with plutonium but other problems occur. When most diluents are added to plutonium, the neutrons tend to be moderated, thus increasing the parasitic capture in plutonium 239 to form plutonium 240. Furthermore, diluents have also been found to create competing neutron reactions which also decrease the effectiveness of the reactor for breeding. Likewise, from a metallurgical standpoint, many such alloys of plutonium commonly have phase structures which give the metal undesirable properties.

When $Pu^{240}$ is formed in a fast reactor it adds to the reactivity, since it is a fast neutron fission material. However, $Pu^{240}$ in a reactor whose neutrons have been slowed down acts as a non-fissile material, since it increases non-fission capture. Thus the neutrons captured in producing $Pu^{240}$ in a thermal reactor are lost to the fissile system.

However, in a fast breeder reactor, new plutonium atoms created in uranium add to the reactivity of the reactor. The uranium in such a reactor may be integral in the plutonium core or surround the core as a blanket. The ratio of uranium to plutonium may vary over wide ranges for operative reactors. Since the parasitic capture of neutrons in the reaction $Pu^{239} + {}_0n^1 \rightarrow Pu^{240}$ increases with a decrease of neutron energy, the reactor core must contain materials which will not appreciably moderate fast neutrons.

Fast reactors of the prior art, such as the reactor described in AEC document LA–1679, entitled "The Los Alamos Fast Plutonium Reactor," have operated at low power levels, utilized solid fuel elements, and produced a fast neutron flux of the order of $10^{12}$ neutrons/cm.$^2$-sec., and have not generally been breeder reactors. Since such reactors had relatively low powers and neutron fluxes, the problems of fuel element phase stability at high temperatures, adequate heat removal, fission product dilution, heat transfer characteristics, breeding gains, and increased shielding problems at high neutron flux were problems left unsolved by such reactors of the prior art.

Further, reactors of this type utilizing solid plutonium fuel elements have the construction and operating disadvantages associated with solid fuel elements. Specifically, the fabrication of these fuel elements necessitates elaborate health precautions in fabricating. Reprocessing costs are considerably higher and fission products cannot be removed without removing the fuel element with resulting shut-down or the use of elaborate apparatus for loading and unloading during operation and for protection against the radiation hazards associated therewith. Other disadvantages of solid plutonium fuel elements include the many phase changes, and consequent density and dimensional changes, which may take place during thermal cycling.

Therefore, it is an object of the present invention to provide a fast breeder reactor which utilizes molten plutonium-containing fuels.

Another object of the present invention is to provide such a fast breeder reactor in which the fissionable material is liquid during operation and may be circulated external to the core for reprocessing and recovery.

A further object of the present invention is to provide a fast reactor fueled by molten plutonium or alloys thereof contained in a refractory metal heat exchanger and cooled by liquid sodium flowing through the core, the fuel being subdivided in the heat exchanger so that it is cooled primarily by conduction and some convection rather than by forced circulation of the fuel external to the core and in which the liquid fuel is capable of being drained from the core for reprocessing purposes and nuclear safety.

A still further object of the present invention is to provide such a reactor wherein the core is substantially surrounded by a breeding blanket and in which more plutonium is produced than is burned in the core.

Other objects and advantages of the present invention will become more apparent from the following description including drawings, hereby made a part of the specification, wherein.

TABLE I

Summary of Reactor Specifications

[Preferred embodiment]

Figure 1:
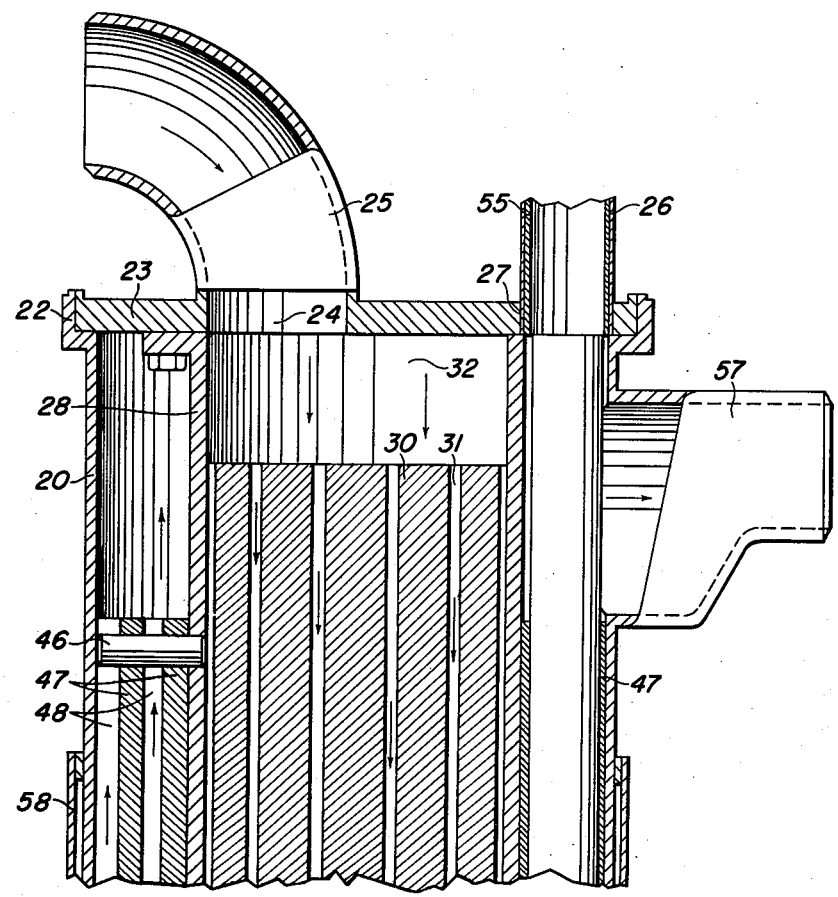
FIGURE 1 is a sectional view of the upper portion of the preferred embodiment of the reactor of the present invention.

Materials:
 Fuel type _____ Plutonium - iron alloy (9.5 a/o Fe, 90.5 a/o Pu).
 Fuel amount _____ ~20 kg.
 Fuel consumption _____ ~1 gm./day.
 Coolant tubes _____ Tantalum.
 Reflector _____ Iron.
 Coolant _____ Sodium.
 Breeding blanket _____ Natural uranium.
 Structural material _____ Stainless steel - tantalum.
 Shield _____ Lead, steel, heavy concrete.
Dimensions:
 Lattice _____ 169 tubes.
 Reflector _____ Radial ~3 in. Fe.
 Over-all _____ 2 ft. dia. x 8 ft. high.
Cooling system:
 Type _____ Recirculated sodium.
 Coolant treatment _____ Removal of oxygen by hot trap.
 Pumps _____ Conduction electromagnetic pumps.
 Protective atmosphere above sodium _____ Argon.
 Coolant inlet temperature _____ 500° C.
 Coolant outlet temperature _____ 600° C.
 Coolant velocity _____ ~5 ft./sec.
 Coolant inlet pressure _____ 10 p.s.i.
 Coolant pressure drop through reactor _____ 3 p.s.i.
 Pumping rate _____ 150 g.p.m.
 Pumping power _____ 15 kw.
Operating conditions:
 Total heat power _____ 1000 kw.
 Heat flux (average) _____ ¼ × 10⁶ B.t.u./ft.²/hr.
 Power density (average) _____ 350 kw./lit.
 Specific power (average) _____ 40 kw./kg.
 Maximum fuel temperature _____ 650° C.
 Neutron flux density—
  Fast (max.) _____ 4×10¹⁴n/cm.²-sec.
  Thermal (max.)—
   Core _____ Negligible.
   Graphite _____ ~10¹³n/cm.²-sec.
 Median fission energy _____ 1.05 mev.
 Effective prompt neutron life ___ 5.8×10⁻⁹-sec.
 Power ratio (center/edge) _____ 1.48.
 Temperature coefficient of reactivity _____ −3.3¢/° C. prompt, −3.6¢/° C. total.
 Total shim control _____ $16.15
Core composition:
 Fuel alloy (Pu-Fe) _____ 50% by volume.
 Tantalum container _____ 15% by volume.
 Sodium _____ 35% by volume.
 Core radius (inside vessel) _____ 7.54 cm.
 Core height _____ 14 cm.
Breeding: Breeding ratio _____ ~1.5.
Sphere (S₄ Multigroup):
 Bare core buckling _____ $B^2 = .059$ cm.⁻².
 Bare core extrapolated radius ___ $R_{ex} = 12.92$ cm.
 Bare core critical radius _____ $R_c = 10.33$ cm.
Cylinder (S₄ Multigroup):
 Side reflector savings _____ $\delta \cong 5.08$ cm.
 Top and bottom reflector savings. $\delta \cong 4.17$ cm.
 Critical mass alloy (Pu.₉Fe.₁) __ $CM = 20$ kg.
 Cylindrical radius _____ $R_{cyl} = 7.54$ cm.
 Cylindrical height _____ $H_{cyl} = 14$ cm.
 Cylindrical volume _____ $V = 2.48$ liters.

$k_{core} = \frac{\nu \Sigma_f}{\Sigma_a}$ _____ $k_{core} = 2.66$.

$k_{eff}$ _____ Adjusted to unity by geometry and by dilution.

Central median fission energy _____ $\bar{E}_f = 1.05$ mev.

Prompt neutron lifetime _____ $\frac{1}{V\Sigma_a \nu} = 5.8 \times 10^{-9}$ sec.

Flux grouping:

| Group | $E_n$ | $\phi_z$ |
|---|---|---|
| 1 | 10→2.23 Mev | .203 |
| 2 | 2.23→1.35 Mev | .177 |
| 3 | 1.35→.498 Mev | .325 |
| 4 | .498→.183 Mev | .187 |
| 5 | .183→.067 Mev | .079 |
| 6 | .067→.0248 Mev | .022 |
| 7 | .0248→.0091 Mev | .005 |
| 8 | 9.12 Kev.—167 ev | |
| 9 | 167 ev.—1.125 ev | |
| 10 | 1.125 ev.—.06 ev | |

Power ratio, center/edge P.R.=1.48.

Computations based upon absolute multiplication were made and are, therefore, explicitly independent of expansion coefficients. The following expansion coefficients were assumed:

$\frac{\Delta\rho}{\rho}\Big|$ fuel .................................... $.75 \times 10^{-4}/°$ C.

$\frac{\Delta\rho}{\rho}\Big|$ Na ..................................... $3. \times 10^{-4}/°$ C.

$\frac{\Delta\rho}{\rho}\Big|$ Ta ..................................... $.105 \times 10^{-4}/°$ C.

$\frac{\Delta\rho}{\rho}\Big|$ Fe ..................................... $.3 \times 10^{-4}/°$ C.

$\frac{\Delta\rho}{\rho}\Big|$ Al ..................................... $.81 \times 10^{-4}/°$ C.

The side reflector was computed for the following radial thickness:

|  | Cm. |
|---|---|
| Core (50% fuel, fuel $\rho = 16.7$ g./cc.) | 0–7.54 |
| Fe at 90% density | 7 |
| Air gap | 0.2 |
| Al | 10.2 |
| Air gap | 10 |
| Graphite | 15 |

The top reflector consisted of 1.9 cm. Na, 22.8 cm. 65% Fe+35% Na.

The radial contribution to the over-all buckling is estimated as 61.8% for an equivalent core diameter of 5.9-in.

Density changes:

$\frac{\partial K}{\partial \theta}\Big|$ core fuel ........................... $-2.469¢/°$ C.

$\frac{\partial K}{\partial \theta}\Big|$ core Na ............................ $-.186¢/°$ C.

$\frac{\partial K}{\partial \theta}\Big|$ side reflector Na ............... $-.003¢/°$ C.

$\frac{\partial K}{\partial \theta}\Big|$ side reflector Fe ............... $-.069¢/°$ C.

$\frac{\partial K}{\partial \theta}\Big|$ reflector Na, ends ............ $-.288¢/°$ C.

$\frac{\partial K}{\partial \theta}\Big|$ reflector Fe, ends ............ $-.076¢/°$ C.

$\frac{\partial K}{\partial \theta}\Big|$ total core density .............. $-3.031¢/°$ C.

$\frac{\partial K}{\partial \theta}\Big|$ Al shim ............................. $-.045¢/°$ C.

Geometry:

$\frac{\partial K}{\partial \theta}\Big|$ Ta core expansion ............. $+.126¢/°$ C.

$\frac{\partial K}{\partial \theta}\Big|$ Fe side reflector expansion ... $+.053¢/°$ C.

$\frac{\partial K}{\partial \theta}\Big|$ total core geometry ............ $+.179¢/°$ C.

$\frac{\partial K}{\partial \theta}\Big|$ total core (density+geometry) ... $-2.852¢/°$ C.

$\frac{\partial K}{\partial \theta}\Big|$ Al shim expansion ............... $-.116¢/°$ C.

Gaps:

$\frac{\partial K}{\partial r}\Big|$ core radius ......................... $+296¢$/millimeter (Pu alloy additions).

$\frac{\partial K}{\partial z}\Big|$ core height ......................... $+97¢$/millimeter (Pu alloy additions).

$\frac{\partial K}{\partial r}\Big|$ reflector shim gap ............... $+28.9¢$/millimeter (Fe or Al over air).

Shim:

$\frac{\partial K}{}$ shim out ............................ $-1523¢$.

$\frac{\partial K}{}$ shim out (1% $B^{10}$ in C) ........ $-1615¢$.

Miscellaneous:
$\partial K|$ no Na in core ........................ $-616¢$.

$\partial R|$ 1% $B^{10}$ in C (compared to no $B^{10}$) ....... $-66.5¢$.

See report K–1–3049, declassified May 6, 1957, entitled "Some Applications of the $S_n$ Method," by R. M. Kiehn, submitted for publication in "Nuclear Science & Engineering," the disclosure of which is incorporated herein by reference.

APPARATUS

PREFERRED EMBODIMENT

Figure 2:
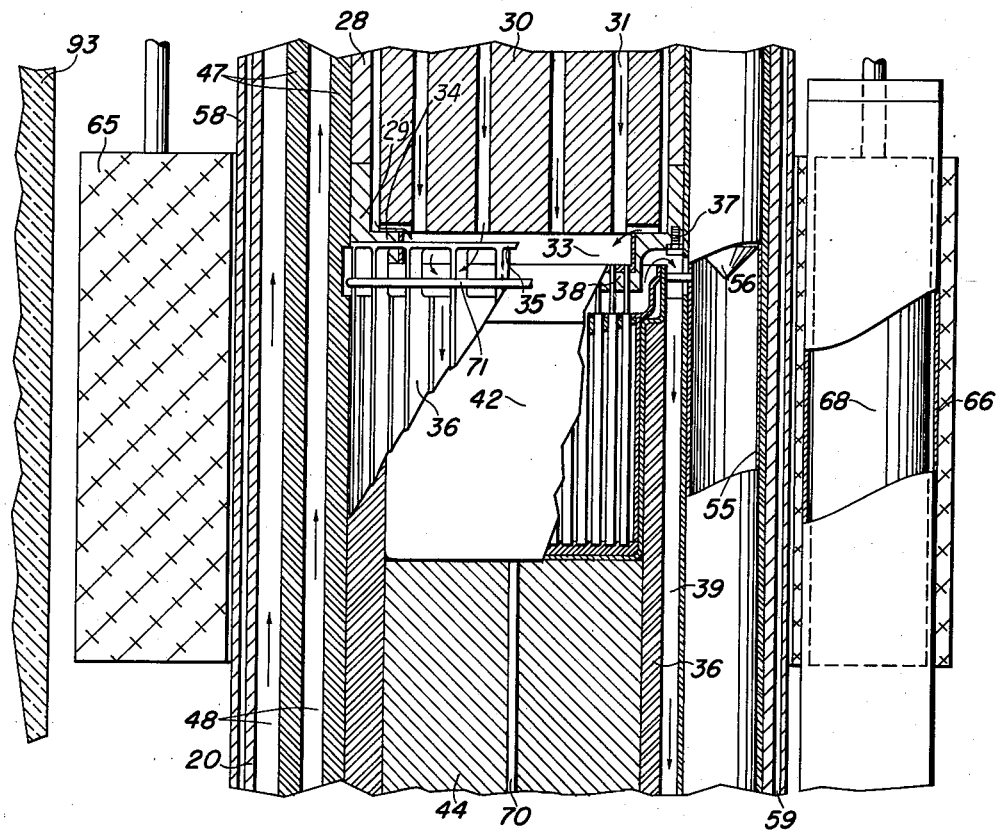
FIGURE 2 is a sectional view of the middle portion of the reactor, immediately below the portion shown in FIG. 1.
Figure 3:
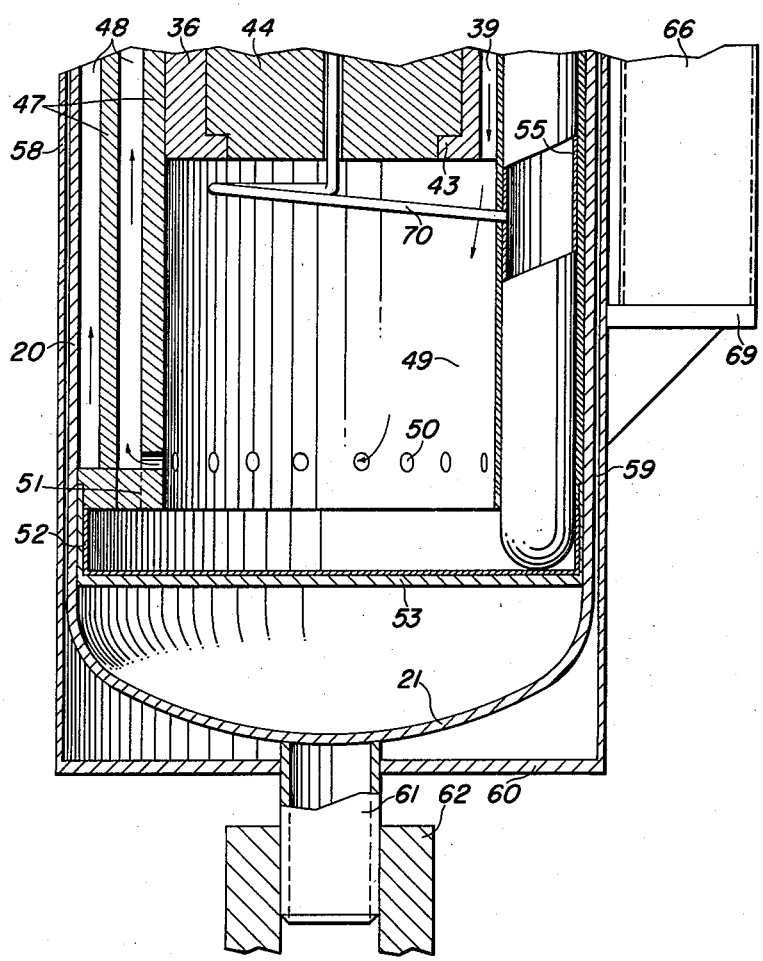
FIGURE 3 is a sectional view of the bottom portion of the reactor, immediately below the portion shown in FIG. 2.

The reactor of the preferred embodiment in the present invention is shown in FIGURES 1, 2 and 3, Figure 1 being the top portion, FIGURE 2 being the center portion and FIGURE 3 being the bottom portion of the reactor. The reactor consists of a pressure vessel 20 fabricated from stainless steel having a cylindrical geometry and a dish shaped bottom portion 21 (FIG. 3). The upper extremity of the pressure vessel 20 has a flange 22 to which is welded or otherwise integrally attached a top plate 23 which seals the interior of the vessel from the outside environment. The top plate 23 has an aperture 24 which connects the interior of vessel 20 with the inside of coolant inlet pipe 25, the inlet pipe 25 being welded or otherwise sealed to the top plate 23. A fuel reservoir container 26 extends through an aperture 27 in the top plate 23 near the outer periphery of the top plate 23, and is sealed to the top plate 23.

Suspended from the top plate 23 is a cylindrical support member 28, which is attached to the bottom of top plate 23 by bolts. The cylindrical support member extends downwardly into the cavity of the pressure vessel 20 and has a bottom support flange 29 (FIG. 2). Within the cylindrical support member 28 is the upper reflector 30, consisting of a cylinder of iron having a plurality of passages 31 which connect the coolant inlet reservoir volume 32 (FIG. 1) with the volume 33 (FIG. 2) immediately above the reactor core assembly. The cylindrical support member 29 has a flange 34 along its bottom inner surface in which the upper flange 35 of the core container 36 is attached by bolts 37 or equivalent means. In this manner the core container 36 is supported by the cylindrical support member 28. The bottom support flange 29 of the cylindrical support member 28 has a downwardly extending tube support member or coolant inlet header 38 which, in the preferred embodiment, supports the reentrant tubes, as explained in detail hereinafter. The core container 36 supports a tantalum core cage container 42 in which the molten plutonium fuel is contained and through which the coolant passes, as is explained in more detail hereinafter. The core container 36 extends downwardly and has a lower supporting flange 43 (FIG. 3) which supports the bottom reflector 44 which is constructed of iron. It should be noted that the coolant flow is primarily around the exterior of the core container 36. However, passages may be added between the core cage container 42 and the core container 36 to cool the outer surface of the core cage container 42, in which case the reflector 44 would be provided with a plurality of coolant channels (not shown) similar to the upper reflector 30.

The cylindrical support member 28 has in its upper portion (FIG. 1) a plurality of supporting rods 46 integrally attached thereto and extending outwardly toward the pressure vessel 20, which supporting rods pass through an aperture in the stationary iron reflector 47, thereby axially supporting the stationary radial reflector 47. The stationary reflector 47 is constructed of layers of cylindrical segments, each layer being provided with coolant channels 48 on their outer surfaces. The stationary reflector extends downwardly over the major portion of the pressure vessel length and terminates in the bottom portion of the pressure vessel 20. The channels 48 of reflector 47 are connected to the coolant volume 49 (FIG. 3) by means of a plurality of horizontal holes 50 and channels 51. Welded to the outer bottom periphery of the reflector 47 is a tubular member 52 which is welded to a bottom plate 53 thereby providing a cup which is lined with tantalum. This cup, consisting of elements 52 and 53, provides a container in which the plutonium fuel will be contained in case of a mechanical failure within the core cage container 42.

The fuel reservoir container 26 (FIG. 1) contains a tantalum reservoir 55 which extends downwardly through the top plate 23 to the bottom plate 53. This tantalum reservoir contains the plutonium-containing fuel to be used in the reactor and has a vertically movable positive displacement plunger 56, which is controlled from outside of the reactor shielding and which is used to displace the plutonium fuel from the reservoir into the core container 36.

A coolant outlet pipe 57 is provided on the outer periphery of the pressure vessel 20 in the upper portion thereof and is welded and sealed to the pressure vessel 20. The pressure vessel 20 is contained within a second containing vessel 58 which is welded to and spaced from the pressure vessel 20. The space 59 between the pressure vessel 20 and outer containing vessel 58 may contain electrical heating elements (not shown) to be used in start-up operations, as explained hereinafter. The second containing vessel 58 has a bottom plate 60 which is welded to a radial support member 61, which support member is integral with the dish shaped bottom portion 21 of the pressure vessel 20 and extends downwardly through the containing vessel 58. A radial support guide member 62 is provided around the radial support member 61 so that the radial support member 61 is freely movable in the vertical direction within the radial support guide member 62. Since the reactor pressure vessel 20 is supported from the top, by structure not shown, expansion in the vertical direction due to heating is allowed by the arrangement of the radial support member 61 and radial support guide member 62.

Surrounding the central portion of the reactor pressure vessel 20 and outside of the containing vessel 58 is a cylindrical reflector assembly 65. The reflector assembly 65 contains a plurality of control and/or oscillating rods vertically movable within the movable parts of the cylindrical reflector assembly 65. The control rod assembly consists of a control rod tube 66 integrally attached to the reflector assembly 65 and supported by a control rod support 69 attached to the outer surface of the second containing vessel. A control rod 68 is vertically movable within the control rod tube 66. A more detailed explanation of the reflector assembly is contained hereinafter in the explanation of FIG. 5.

The lower portion of reservoir 55 is connected through a fuel pipe 70 to the bottom of core cage container 42. In this manner the movement of the plunger 56 down into the fuel will cause plutonium containing fuel to be displaced upwardly through pipe 70 into the container 42.

Figure 4:
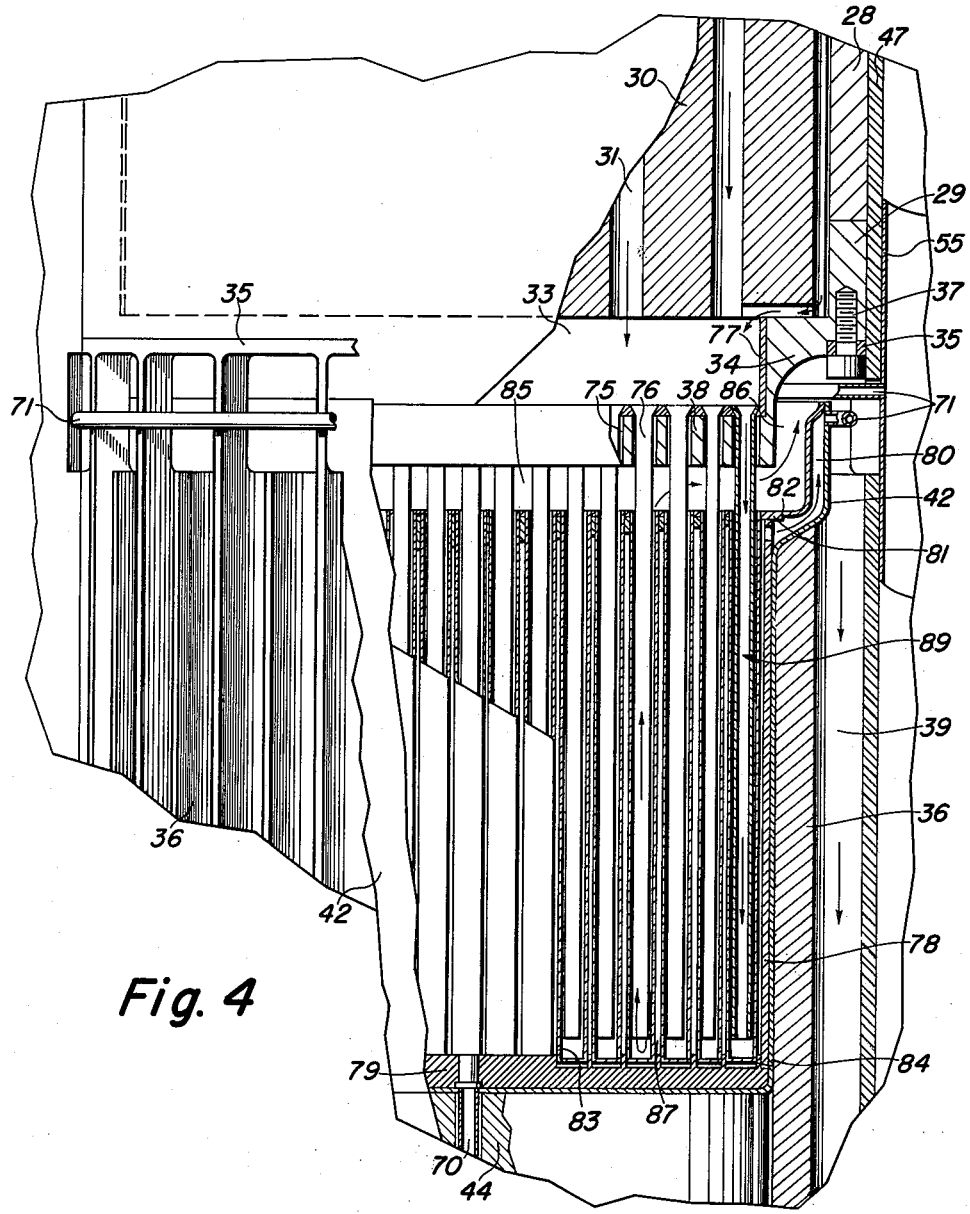
FIGURE 4 is a detailed sectional view of the core region of the preferred embodiment.

Referring now to FIGURE 4, which shows a detailed cross section of the core region of the reactor of the preferred embodiment, the tube support member 38 contains a plurality of apertures 75 through which a plurality of tantalum tubes 76 extend downwardly. The tubes 76 are welded to a liner 77 which is attached to the top surface of tube support member 38 and the inner surface of bottom support flange 34. The core cage container 42 contains a structural support sleeve of tantalum 78 which is supported on a tantalum plate 79 and keeps the core cage container 42 from collapsing axially during the evacuation prior to start-up. The plate 79 locates and supports against lateral movement the outer tube 83 of the bayonet assembly. The core cage container 42 has an upper peripheral volume 80 to compensate for fuel expansion during initial operation, the fuel in volume 80 being essentially ineffective with respect to the reactivity in the core. The upper member 81 of the core cage container 42 is welded to the inner flange 82 of the core cage container 42 and consists of a circular plate having a plurality of holes passing through it, the plate having its bottom surface inclined upwardly so that, as will be apparent hereinafter, any gases formed during operation will tend to move outwardly and upwardly into the volume 80. The member 81 has a plurality of tubes 83 having closed bottom ends and welded to and extending through the plurality of apertures therein. The tubes 83 extend downwardly into the core cage container 42 and terminate above the recessed grooves in the tantalum plate 79. The downwardly extending tubes 83 are supported against lateral displacement by circular ridges 84 on the tantalum plate 79. The tubes 76 extend downwardly until they terminate with open ends in the lower portion of the tubes 83. In this manner the volume 33 immediately below the upper reflector 30 is connected through the interior of tubes 76 to the bottom of tubes 83 upwardly through the annular volume around the outside of tubes 76 to the volume 85 immediately above the upper member 81 of the core cage container 42. The volume 85 is connected through channel 86 to the peripheral channels 39 in the core container 36. The arrangement of tubes within the core cage container 42 leaves a fuel containing volume 87, which consists of the volume in the interstices of the tube bundle. It is the volume 87 which contains the plutonium or plutonium alloy used as a fuel in the reactor of the preferred embodiment.

The volume 80 of the core cage container 42 is connected by spiraling pipe 71 to the interior of the tantalum reservoir 55. In this manner fission product gases may escape from the volume 80 into the reservoir 55 where they may be removed by passing upwardly around the displacement plunger 56.

Figure 5:
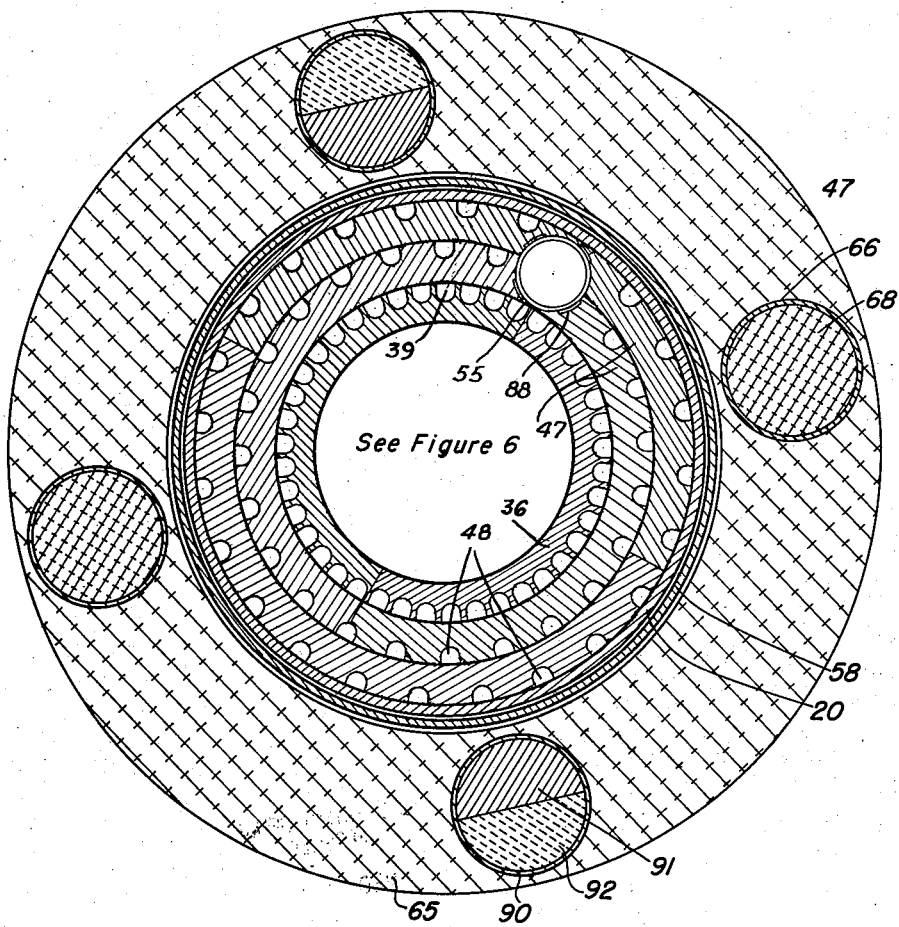
FIGURE 5 is a detailed cross sectional view of the reactor of the preferred embodiment.
Figure 6:
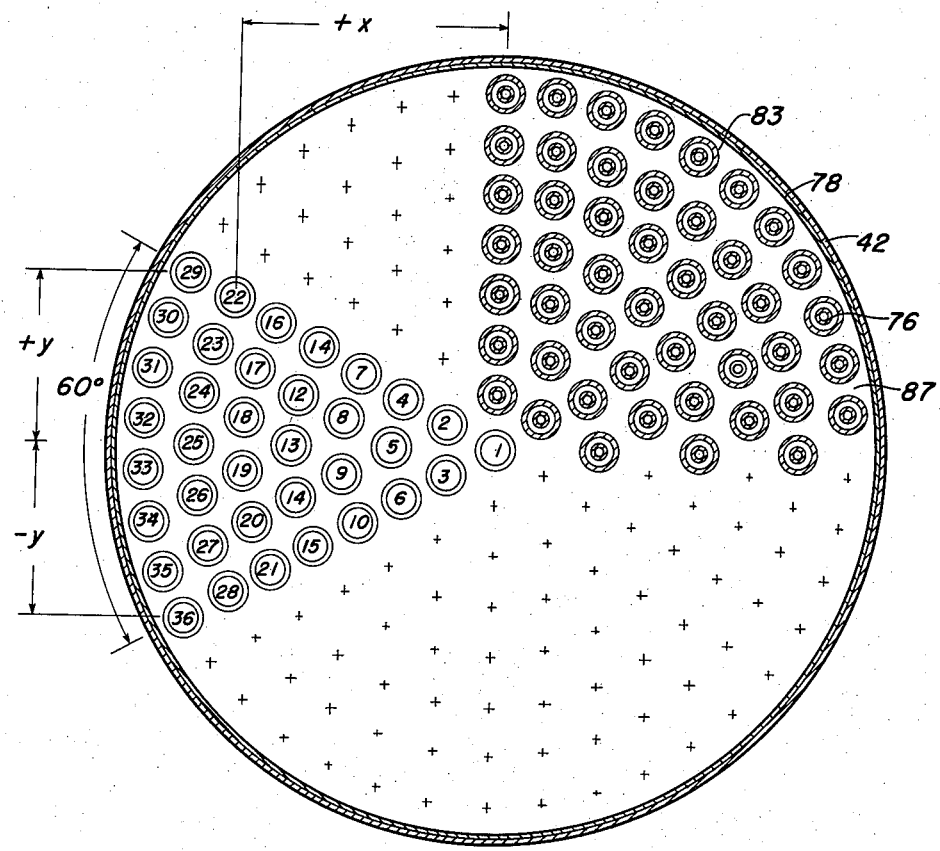
FIGURE 6 is a detailed cross sectional view of the core region of the reactor of the preferred embodiment.

A more meaningful physical picture of the arrangement of the tubes, reflectors and various containers is shown in the sectional view of FIGURES 5 and 6. Specifically, FIGURE 5 shows the control shim or reflector assembly 65 which is located external to and spaced from the second containing vessel 58 which in turn is located external to and spaced from the pressure vessel 20. Inside of the pressure vessel 20 are the cylindrically segmented, stationary iron reflectors 47 which have a plurality of channels 48. In the reflectors 47 is located the fuel reservoir 55. The fuel reservoir 55 has a plurality of coolant channels 88 along its outer surface to provide a means for controlling the temperature in the fuel reservoir 55. Located within the reflectors 47 is a core container 36 having a plurality of channels 39 on its outer periphery and in which the core cage container 42 is located.

The detailed cross section of the core cage container 42 which is located within the central volume of reflector 47 is shown in FIGURE 6. Within the core cage container 42 is a support sleeve 78 and a plurality of tubes 83 into which extend the re-entrant tubes 76. It is apparent from FIGURE 6 that the liquid fuel volume 87 surrounds each of the tubes 83 so that coolant flowing on the inner surface of tubes 83 is in conductive contact with the reactor fuel. Only a portion of the tube assemblies are shown to simplify the illustration, however the centers of all tube assemblies are indicated. In the preferred embodiment there are 169 tube assemblies 89 where each tube assembly consists of tubes 83 and re-entrant tubes 76. The coordinates for a 60° segment of numbered holes in FIG. 6 are shown in Table II, the other segments have identical hole arrangements.

TABLE II

[Hole coordinates (cm.)—Tolerance±.05]

| Hole No. | Abscissa (x) | Ordinate (y) |
| --- | --- | --- |
| 1 | 0.00 | 0.00 |
| 2 | 8.69 | 5.02 |
| 3 | 8.69 | −5.02 |
| 4 | 17.42 | 10.03 |
| 5 | 18.14 | 0.00 |
| 6 | 17.42 | −10.03 |
| 7 | 26.07 | 15.05 |
| 8 | 27.52 | 5.05 |
| 9 | 27.52 | −5.05 |
| 10 | 26.07 | −15.05 |
| 11 | 34.76 | 20.07 |
| 12 | 36.95 | 10.14 |
| 13 | 37.68 | 0.00 |
| 14 | 36.95 | −10.14 |
| 15 | 34.76 | −20.07 |
| 16 | 43.44 | 25.08 |
| 17 | 46.40 | 15.27 |

TABLE II—Continued

| Hole No. | Abscissa (x) | Ordinate (y) |
|---|---|---|
| 18 | 47.89 | 5.13 |
| 19 | 47.89 | -5.13 |
| 20 | 46.40 | -15.27 |
| 21 | 43.44 | -25.08 |
| 22 | 52.15 | 30.10 |
| 23 | 55.88 | 20.44 |
| 24 | 58.16 | 10.33 |
| 25 | 58.92 | 0.00 |
| 26 | 58.16 | -10.33 |
| 27 | 55.88 | -20.44 |
| 28 | 52.15 | -30.10 |
| 29 | 60.82 | 35.12 |
| 30 | 65.38 | 25.66 |
| 31 | 68.47 | 15.63 |
| 32 | 70.04 | 5.25 |
| 33 | 70.04 | -5.25 |
| 34 | 68.47 | -15.63 |
| 35 | 65.38 | -25.66 |
| 36 | 60.82 | -35.12 |

In the outer reflector assembly 65 it is apparent from FIG. 5 that the preferred embodiment utilizes four control rods, some of which may be oscillator rods. The oscillator rods 90 consist of a half rod composed of reflecting material 91 and a half rod composed of a neutron absorbing material 92. These rods are rotatable about a vertical axis so that a portion or all of the reflector can be exposed to the neutron flux from the core region within the core cage container 42, or a portion or all of the absorber material 92 can be moved into proximity with respect to the critical region. In this manner very fine control over the criticality can be maintained. The control rods 68, contained within the control rod tube 66, are used primarily for gross adjustments in reactivity. Furthermore, the entire reflector assembly 65 is vertically movable with respect to the critical region and in this manner reflective control may also be accomplished. Surrounding the entire reactor at the core level (see FIG. 2) is a breeding blanket 93, preferably of uranium, in which, through neutron capture, plutonium 239 is formed.

TABLE III

*Summary of Reactor Specifications*

Figure 7:
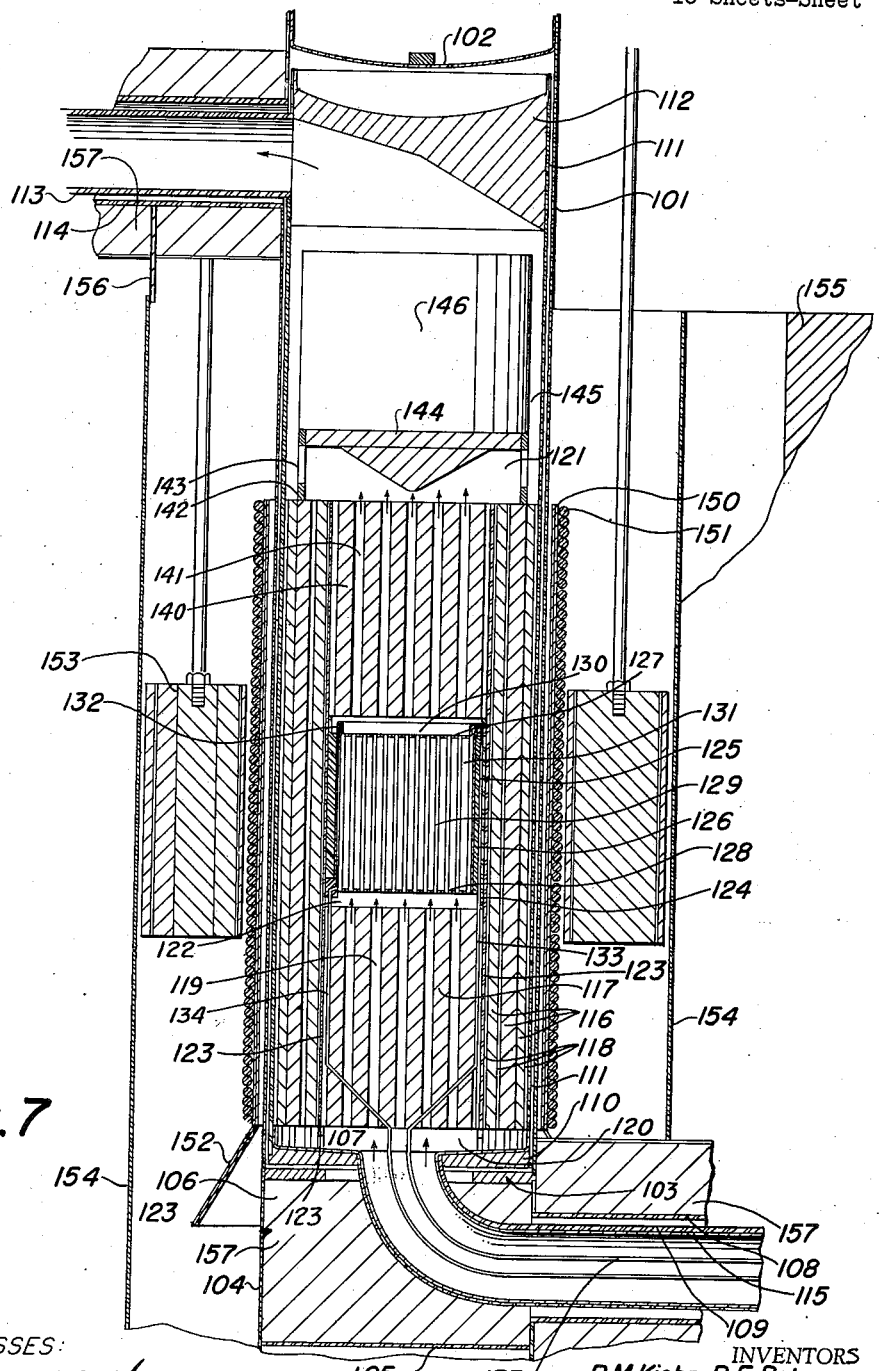
FIGURE 7 is a sectional view of a second reactor embodiment.
Figure 8:
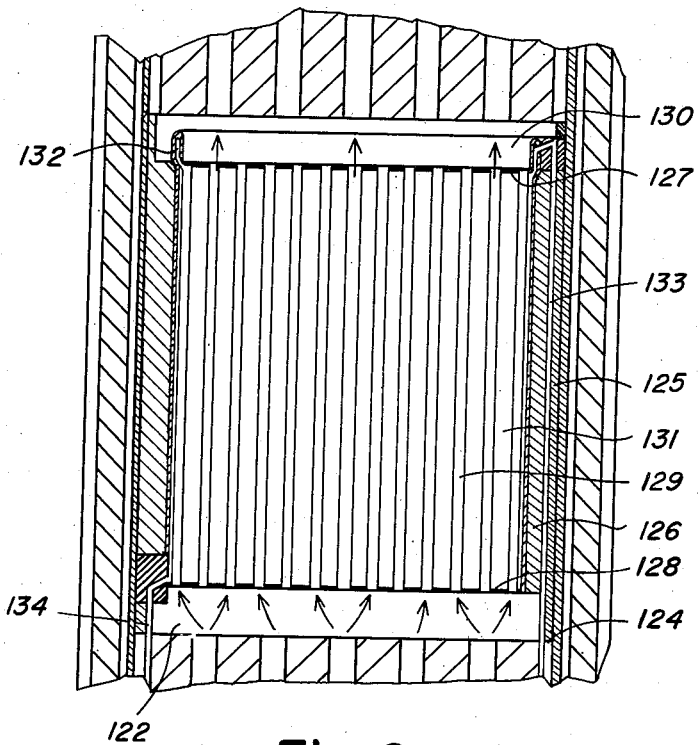
FIGURE 8 is a detailed sectional view of the core region of the second reactor embodiment.

[Embodiment of FIGS. 7 and 8]

Materials:
- Fuel type _____ Pu–Fe.
- Fuel amount _____ ~20 kg.
- Fuel consumption _____ ~1 gm./day.
- Coolant tubes _____ Tantalum.
- Reflector _____ Fe.
- Coolant _____ Sodium.
- Structural material _____ Stainless steel-tantalum.
- Shield _____ Lead, steel, heavy concrete.
- Lattice _____ 169 tubes (straight through).
- Reflector _____ Radial —3 in. Fe.
- Over-all _____ 2 ft. dia. x 8 ft. high.

Cooling system:
- Type _____ Recirculated sodium.
- Coolant treatment _____ Removal of oxygen by hot trap.
- Pumps _____ Conduction electromagnetic pumps.
- Protective atmosphere above sodium _____ Argon.
- Coolant inlet temperature _____ 500° C.
- Coolant outlet temperature ____ 600° C.
- Coolant velocity _____ ~5 ft. sec.
- Coolant inlet pressure _____ 10 p.s.i.
- Coolant pressure drop thru reactor _____ ~1 p.s.i.
- Pumping rate _____ 150 g.p.m.
- Pumping power _____ 10 kw.

Operating conditions:
- Total heat power _____ 1,000 kw.
- Power density (average) _____ 350 kw./lit.
- Specific power (average) _____ 40 kw./kg.
- Maximum fuel temperature _____ ~700° C.
- Neutron flux density—
  - Fast (max.) _____ $4 \times 10^{14}$ n/cm.$^2$-sec.
  - Thermal (max.)—
    - Core _____ Negligible.
    - Graphite _____ ~$10^{13}$ n/cm.$^2$-sec.
- Median fission energy _____ 1.05 mev.
- Effective prompt neutron life _ $5.8 \times 10^{-9}$ sec.
- Power ratio (center/edge) _____ 1.48.
- Temperature coefficient of reactivity _____ -3.3 ¢/° C. prompt, -3.6 ¢/° C. total.
- Total shim control _____ $16.15.

TABLE III—Continued

Core composition:
- Fuel alloy _____ 50%.
- Tantalum container _____ 15%.
- Sodium _____ 35%.
- Critical mass _____ 20 kg.
- Core radius (inside vessel) ___ 7.54 cm.
- Core height _____ 14 cm.
- Breeding: Breeding ratio _____ ~1.6.

SECOND EMBODIMENT

A second embodiment of the reactor of the present invention is shown in the sectioned drawing of FIGURE 7. The reactor of this embodiment consists of an outer vessel 101 having a top closure 102 welded to its top portion thereby sealing the interior of the vessel from the outside environment and having bottom plate assembly 103 welded or otherwise sealed to the outer vessel. The outer vessel bottom plate assembly 103 is attached to and supported by base 104 which has a sealing plate 105 which forms a chamber 106 which communicates through aperture 107 with the interior of the outer vessel 101 above the bottom plate assembly 103. Extending radially and welded to the base 104 is a cylindrical duct 108. Inside of and spaced from the cylinder duct 108 is a coolant inlet pipe 109 which passes into the chamber 106 through the cylindrical duct 108 and upwardly through aperture 107 terminating in and attached to base plate 110. The base plate 110, which is spaced from the bottom plate assembly 103 and is supported by coolant inlet pipe 109 and support members not shown, is attached to and supports an inner cylindrical pressure vessel 111 which terminates at its upper extremity in a flow directing baffle plate 112 which is welded to the upper peripheral edge of the inner pressure vessel 111. The coolant outlet pipe 113 extends radially outwardly from the inner pressure vessel 111 through a concentric cylindrical duct 114 which is sealed to the outer vessel 101. In this manner the interior of inner pressure vessel 111 is completely isolated from the volume between the outer vessel 101 and the inner pressure vessel 111. The coolant inlet pipe 109 has a tantalum liner 115 which extends around and lines the base plate 110 thereby providing a surface resistant to plutonium and plutonium alloys, should a mechanical failure result in the presence of plutonium within the inlet pipe 109 or on base plate 110.

Supported by the base plate 110 and contained within the inner pressure vessel 111 is a radial reflector assembly 116 consisting of a plurality of cylindrical segments and a bottom reflector assembly 117, the reflector assemblies 116 and 117 having coolant passage channels 118 and 119 respectively. The coolant channels 118 extend upwardly from the inlet coolant chamber 120 to the outlet coolant chamber 121, while the coolant channels 119 extend upwardly from the inlet coolant chamber 120 to core coolant inlet chamber 122. Supported by base plate 110 and extending upwardly inside of the radial reflector assembly 116 is a cylindrical support member 123 which extends the full length of the radial reflector 116 and has a supporting step 124 on which is supported the core cage container 125.

Core cage container 125, see FIG. 8, consists of a cylindrical tantalum tube bundle container 126 having an upper tantalum plate 127 and a bottom tantalum plate 128 welded to its top and bottom inner surfaces respectively. Each of the plates 127 and 128 contain a plurality of apertures in which a plurality of tantalum tubes 129 are welded, the tubes 129 extending through the container 126. The interior of tantalum tubes 129 communicate with core coolant inlet chamber 122 and core coolant outlet chamber 130. The volume 131 between the tubes and within the cylindrical tantalum tube bundle container 126 and between upper and lower tantalum plates 127 and 128 is the core volume and contains the molten plutonium-containing fuel, as discussed in detail hereinafter. Extending upwardly from the upper tantalum plate 127 and communicating with the volume 131 between the plurality of tubes 129 is a fuel distribution chamber 132 which is located around the inner periphery of the cylindrical tantalum tube bundle container 126. The fuel distribution chamber 132 is connected by fuel inlet pipe 133 which extends downwardly along the outside of the lower reflector 117 and through the coolant inlet pipe 109 to a non-critical fuel reservoir, not shown. The critical volume 131 is also connected at its bottom through fuel outlet pipe 134 to a fuel reprocessing system and/or non-critical fuel reservoir, not shown.

An upper reflector 140, see FIG. 7, having a plurality of vertical channels 141 is supported at its periphery by the cylindrical tantalum tube bundle container 126. The channels 141 connect the core coolant outlet chamber 130 with the outlet coolant chamber 121.

A tubular spacer 142 is supported by the radial reflector 116 and has a plurality of coolant flow apertures 143 located along its periphery. The tubular spacer 142 supports a flow directing baffle 144 which extends downwardly into the outlet coolant chamber 121 and which directs the flow of coolant from passages 141 radially outward through apertures 143 into channel 145. The tubular spacer 142 also supports an upwardly extending steel shield 146. The channel 145 is located between the inner pressure vessel 111 and the cylindrical upwardly extending steel shield 146.

The outer vessel 101 is surrounded by a heating coil support cylinder 150 which extends the full length of the radial reflector 116 and is spaced from the outer vessel 101. An induction coil 151 is wound around the support cylinder 150 and is connected to a suitable electrical source, not shown. The support cylinder 150 has an outwardly extending flared portion 152.

Located externally to the heating coils 151 are the control shims 153 which are cylindrical in form and essentially identical to the control shims of the preferred embodiment. Surrounding the entire reactor assembly as described and located radially outwardly from the control shims 153 is an air flow directing baffle 154 which is cylindrical in shape and extends from the top of the neutron shield 155, e.g., graphite, to a point slightly below the cylindrical duct 108 and which is supported by the cylindrical duct 108 and by support members 156 from the upper cylindrical duct 114.

The cylindrical duct 108 and that portion of the coolant inlet pipe 109 which is contained within the chamber 106 as well as upper cylindrical duct 114 are surrounded by insulating material 157 to prevent undue thermal stresses in the reactor vessel during operation.

TABLE IV

*Summary of Reactor Specifications*

[Embodiment of FIGS. 9 thru 12]

Materials:
| | |
|---|---|
| Fuel type | Pu–Fe. (9.5 a/o Fe, 90.5 a/o Pu). |
| Fuel amount | ~35 kg. |
| Fuel consumption | 15 gm./day. |
| Fuel tubes | Tantalum. |
| Reflector | Uranium. |
| Coolant | Sodium. |
| Breeding blanket | Uranium. |
| Structural material | Stainless steel, tantalum. |
| Shield | Lead, steel, heavy concrete, sodium. |
| Lattice | Spiral core tube. |
| Core tube length (single tube) | 140 ft. |
| Reflector | 3″ uranium. |
| Over-all | 2′ dia. x 8′ high (capsule). |

Cooling system:
| | |
|---|---|
| Type | Recirculated sodium. |
| Coolant treatment | Removal of oxygen by hot trap. |
| Pumps | Centrifugal pump. |
| Protective atmosphere above sodium | Helium or argon. |
| Coolant inlet temperature | ~450° C. |
| Coolant outlet temperature | ~600° C. |
| Coolant velocity (through core) | 20 ft./sec. |
| Coolant inlet pressure | 10 p.s.i. |
| Coolant pressure drop thru reactor | 8 p.s.i. |
| Pumping rate | 2000 g./m. |

TABLE IV—Continued

Operating conditions:
| | |
|---|---|
| Total heat power | 15 megawatts. |
| Heat flux (average) | $2.0 \times 10^6$ B.t.u/ft.$^2$/.hr. |
| Specific power (average) | 500 w./gm. |
| Maximum fuel temperature | 750° C. |
| Neutron flux density core— | |
| Fast (max.) | $3 \times 10^{15}$ n/cm.$^2$-sec. |
| Thermal (max.)—Core | Negligible. |
| Median fission energy | .5 mev. |
| Effective prompt neutron life | ~$10^{-7}$ sec. |
| Power ratio (center/edge) | 1.48. |
| Temperature coefficient of reactivity approx | 1.5¢/° C. prompt, 1.8¢/° C. total. |
| Total shim control | Approx. $10.00. |

Core composition:
| | |
|---|---|
| Fuel alloy | 20% by volume. |
| Tantalum container | 25% by volume. |
| Sodium | 45% by volume. |
| Critical mass | ~30 kg. |
| Core radius (inside outer spiral core containing can) | 8½ in. |
| Spiral core height | 8½ in. |
| Breeding: Breeding ratio | ~1.5. |

THIRD EMBODIMENT

Figures 9, 10:
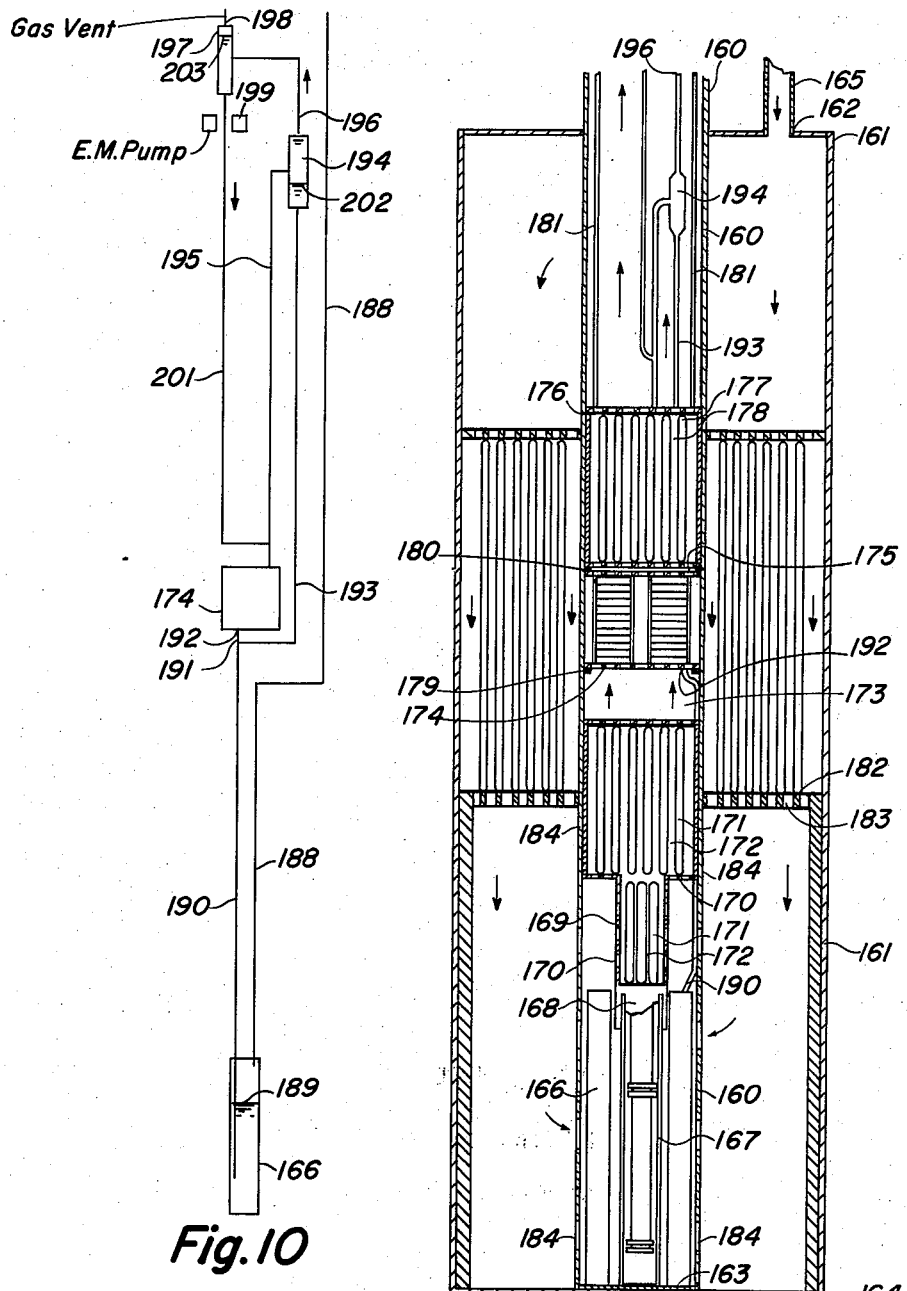
FIGURE 9 is a sectional view of a third reactor embodiment.
FIGURE 10 is a schematic diagram of a liquid fuel handling system for the reactor embodiment of FIG. 9.

A third embodiment of the reactor of the present invention is shown partially sectioned and partially schematic in FIGURE 9 of the drawings. In this embodiment a reactor vessel or core capsule 160 made of stainless steel and having a tubular shape extends the full length of the reactor assembly. The cylindrical vessel 160 is contained within an assembly vessel 161 which is also constructed of stainless steel and which has a top plate 162 which is sealed to the outer periphery of the core capsule 160 in slideable relation therewith. The core capsule 160 has a bottom plate 163 which is supported by the bottom plate 164 of the assembly vessel 161. The top plate 162 has a plurality of coolant inlet pipes 165 located in symmetrical arrangement around the core capsule 160 through which the coolant flows downwardly into the volume between core capsule 160 and assembly vessel 161. The core capsule 160 contains a plurality of liquid fuel reservoir tanks 166, a plurality of reservoir tanks being provided so that a non-critical geometry of the fuel within the reservoir tanks can be maintained. The reservoir tanks 166 are located along the inner surface of the core capsule 160 and are supported by the bottom plate 163. Located within the cylindrical array of reservoir tanks 166 is a hydraulic piston assembly 167 which may be operated by the coolant or which may require predetermined coolant flow before it will operate. The movable portion 168 of the hydraulic piston assembly 167 supports a container 169 which has a plurality of apertures 170 and which contains a plurality of uranium elements 171 which are supported within and in spaced relation thereby forming channels 172 through which the coolant may flow upwardly into the coolant inlet volume 173 which is located immediately below the core cage container 174. The container 169, being movable in a vertical direction, is part of the control mechanism of the present embodiment since the uranium elements 171 will act as a reflector for fast neutrons and therefore their position with respect to the core cage container 174 will affect the reactivity of the fuel. The core cage container has a coolant outlet volume 175 located above its upper surface and an upper reflector assembly 176 which is vertically movable with respect to the core and which contains a plurality of uranium elements 177 and coolant flow channels 178. The core cage container 174 is supported within the core capsule 160 by flange 179, while the lower position of the upper reflector 176 is defined by a flange 180. The upper reflector 176 is supported on shim control rods 181 which are connected to a worm gear arrangement, not shown, so that upper reflector 176 may be used as a shim control. Located outside of the core capsule 160 adjacent the core cage container 174 is a uranium blanket with a plurality of coolant channels passing therethrough which is supported upon an inwardly extending flange member 182 having a plurality of apertures 183 passing vertically therethrough. The flange member 182 also serves as a radial support for the core capsule 160 and is in slideable relation with the assembly vessel 161, i.e., the volume below the flange 182 and outside of the core capsule 160, is filled with coolant and passages 184 are provided in the core capsule so that the coolant will flow into the core capsule 160 and the apertures 170 in the container 169.

The schematic arrangement shown in FIGURE 10 shows the details of fuel handling system of the reactor embodiment of FIGURE 9. Specifically the reservoir tanks 166 contain a volume of liquid fuel having a level 189 and a re-entrant tube 190 which terminates slightly above the bottom of reservoir tank 166. The tube 190 enters the reactor core region through pipe 191 at the bottom at a position 192, which position is in the bottom of the core cage container 174. A branch pipe 193 extends upwardly around the core cage container 174 and is connected to the bottom of a settling tank 194. The upper extremity of core cage container 174 has a circulating pipe 195 which is connected to the middle or upper side portion of the settling tank 194. The top of settling tank 194 is connected through a pipe 196 to the upper side portion of a scavenging fluid reservoir tank 197. The top of scavenging fluid reservoir tank 197 is connected through pipe 198 to a gas vent, not shown. The bottom portion of reservoir tank 197 is connected through an electromagnetic (E.M.) pump 199 by pipe 201 to the circulating pipe 195 at a point immediately above the core cage container 174.

The operation of the fuel circulating system shown in FIGURE 10 is as follows:

A conduit 188 which is connected to an independent source of Na or NaK which is provided with a suitable pressurizing means is connected to the top of reservoir tanks 166 so that upon forcing Na, for example, into the reservoir tanks 166, the level 189 will be forced down and the plutonium containing fuel will be forced upwardly through pipes 190, 191, 193, and 195 to a level 202 in the settling tank 194. In this manner the core cage container 174 will be filled with plutonium containing fuel, as will circulating pipe 195 and branch pipe 193. This is the liquid fuel level during operation of the reactor.

The scavenging fluid reservoir tank 197 has a level 203 of a fission product scavenging fluid such as those disclosed in co-pending application Serial No. 700,917, filed December 5, 1957, now abandoned, by Arthur S. Coffinberry and also assigned to the Government of the United States as represented by its Atomic Energy Commission, entitled "Reactor Fuel Scavenging Means," preferably a calcium-magnesium eutectic in the present embodiment. The E.M. pump 199 pumps the fission product scavenging fluid downwardly through pipe 201 into circulating pipe 195. This fluid, being lighter than plutonium, bubbles up through circulating pipe 195 thereby circulating the plutonium containing fuel upwardly in circulating pipe 195 and into settling tank 194 where the plutonium containing fuel settles to the bottom rapidly and flows downwardly through branch pipe 193, back through bottom position 192 into the reactor core cage container 174. The E.M. pump 199 is regulated so that the flow in pipes 193 and 195 is of the order of a few liters per hour. The contact between the calcium-magnesium eutectic in the preferred embodiment and the plutonium containing fuel, in accordance with the teachings of the above referenced co-pending application of Arthur S. Coffinberry, removes a large portion of the fission products from the fuel. The calcium-magnesium eutectic in settling tank 194 which is located above the level 202 with the plutonium containing fuel circulates upwardly through pipe 196 into scavenging fluid reservoir tank 197. The flow through pipe 196 also removes the gaseous fission products from settling tank 194, which gaseous products are vented through gas vent pipe 198.

In this manner the apparatus of FIGURE 10 provides a simple, safe fission product removal system in which the affinity of certain elements for fission products is utilized to remove these fission products from the core of the reactor. It is also within the purview of the present invention to utilize any of the other fission product scavenging fluids disclosed in the above referenced co-pending application and further to provide additional apparatus for adding plutonium or the alloying element used in the fuel by providing a fuel addition pipe and associated apparatus in the settling tank 194 below the liquid fuel level 202. It is also within the purview of the present invention to utilize the above described fission product removal system with any one or both of the reactor embodiments above described.

Figure 11:
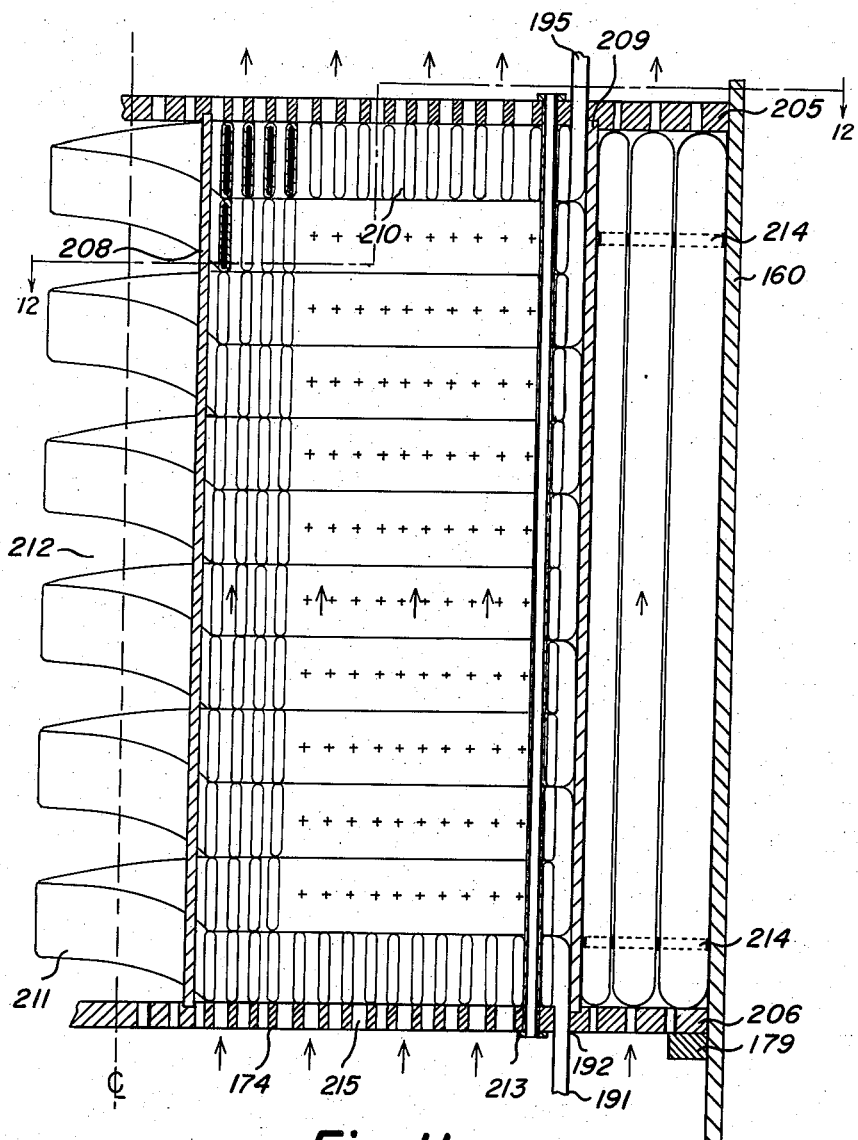
FIGURE 11 is a detailed sectional view of the spiral core of the reactor embodiment of FIG. 9.

A cross sectional view of the spiraling tube core region of the reactor embodiment shown in FIG. 9 is shown in detail in FIG. 11. Specifically, FIG. 11 shows the right half of the spiral core cage assembly which is symmetrical, except for pipes 191 and 195, about the indicated center line and shows the core cage container 174 supported by the flange 179 of the core capsule 160. The core cage container 174 consists essentially of a top plate 205 and a bottom plate 206 having an inside spiral core containing can 208 and an outside spiral core containing can 209 which fit into appropriate slots in upper and lower plates 205 and 206 so that the inside can 208 forms a cylindrical tube symmetrical with the center line while the outside containing can 209 forms a cylindrical tube concentric around the inside tube 208, thereby providing a spiral core containing volume 210. The spiral core indicated generally at 211 has an inlet pipe 191 passing through the bottom position 192 in the core cage container 174 and communicating with the outer end of the first level of the spiral core 211. The spiral core 211 preferably consists of a single flattened tantalum tube 140 ft. long having a height of ¾" and a width of ⅛" with a wall thickness of .020" and spirals inwardly in the first level from the position 192 forming about 15 spirals around the center line of the core. Adjacent the outer surface of the inside spiral core containing can 208 the first level spiral passes through an appropriate aperture in the can 208 and into the central volume 212 of the inside core containing can 208. The first spiral in central volume 212 is bent in such a manner that the direction of the spiral is reversed and a second level of the spiral core is made which spirals outwardly to a position above and adjacent the first level position 192. Immediately adjacent the inside surface of the outer spiral core containing can 209 the tube constituting the spiral core 211 is raised to a third level. The third level spirals inwardly in the same manner as the first. In this manner in the preferred embodiment shown in FIG. 11, twelve levels of spiraling core tube are provided in which the first, third, fifth, seventh, ninth, and eleventh spiral inwardly and the other levels spiral outwardly so that the circulating pipe 195 can be connected directly to the outer spiral in the twelfth level. A plurality of retaining tubes 213 are provided which pass through apertures in upper and lower plates 205 and 206 and extend the full length of the core cage assembly thereby providing axial rigidity as well as providing spacers between individual turns of the spirals at the various levels and maintaining alignment of the tubing to form fluid carrying ducts for the passage of coolant. Thus the spirals in each level are all clockwise, for example, and vertical alignment of each spiral is maintained between levels.

The volume between the outer spiral core containing can 209 and the core capsule 160 contains a plurality of uranium slugs clad in stainless steel or other appropriate metal which act not only as a breeding blanket but also as a fast neutron reflector. These slugs are cylindrical in shape, are located in spaced relation with each other so that coolant may flow along their surface, and are maintained in the indicated spaced relation by a plurality of supports 214 connected to the core capsule 160.

Figure 12:
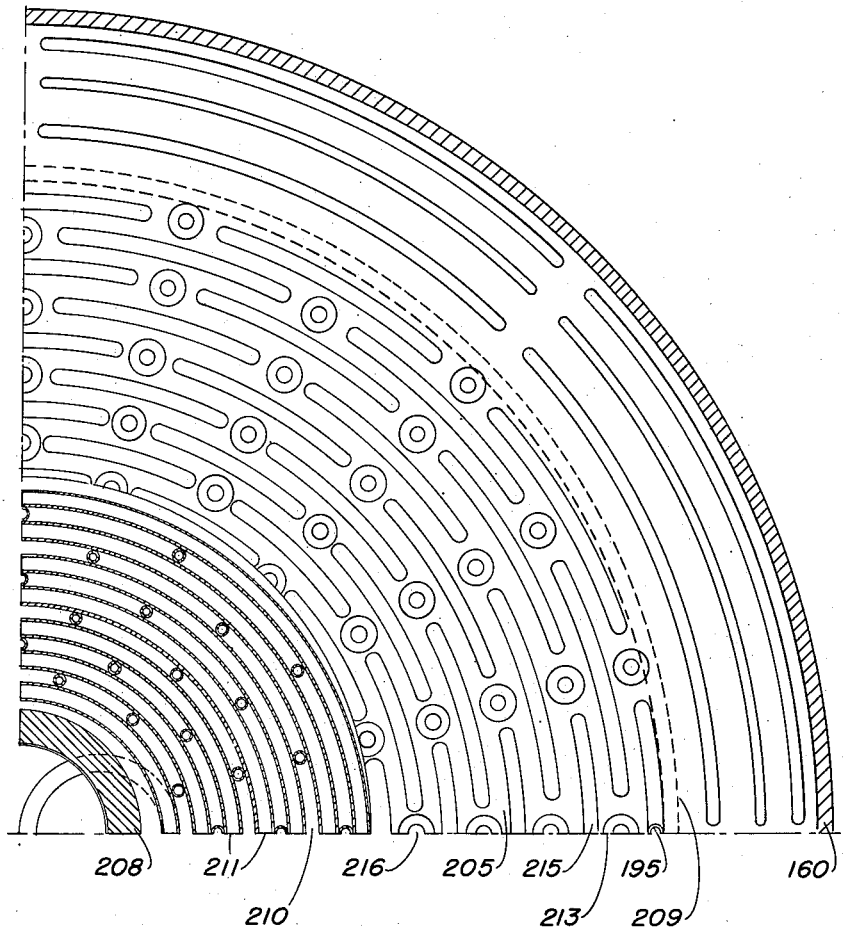
FIGURE 12 is a partial cross sectional view of the spiral core of FIG. 11.

The top and bottom plates 205 and 206 are provided with a plurality of segmental slots 215 and retaining tube holes 216 as is more apparent from FIG. 12 which is a view taken alone line of 12—12 of FIG. 11. The slots 215 are provided in a spiral arrangement so that all of the slots 215 are located directly above the volume 210 between individual spiral coils. In this manner the coolant flows through the core in an unobstructed passage and is in conductive contact with the large vertical surface of the spiral core 211. With such arrangement the amount of heat which may be removed from the core region is increased by a factor of 10 over the core arrangements disclosed in the other embodiments and thus more efficient plutonium use is attained.

It should also be noted that it is within the purview of the present invention to provide an inlet 191 and outlet 195 for each bank of spirals coils, where a bank consists of an even and an odd level of spiral core. Each bank would have an associated fuel reservoir tank 166 or could be connected to various reservoir tanks having different plutonium content percentages. In this manner the fuel density could be varied in the several banks in the core region to control power density, or reactivity control attained in this manner.

COOLING SYSTEM

Figure 13:
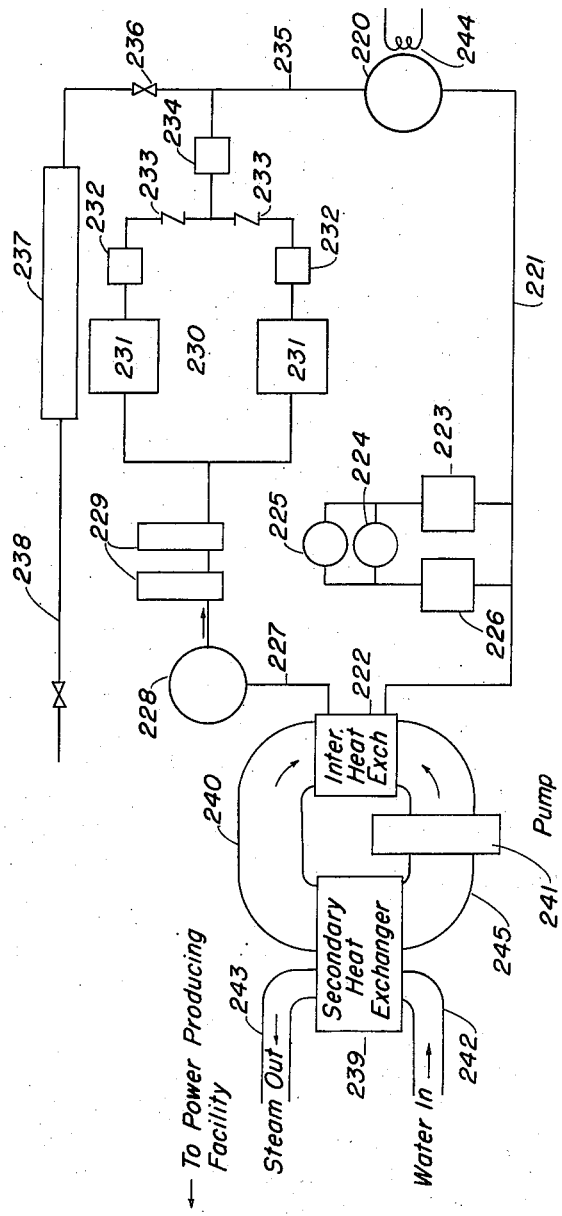
FIGURE 13 is a schematic diagram of the coolant system.

A schematic diagram of the arrangement of the general cooling system is shown in FIGURE 13. The reactor 220, which may be any of the reactors shown in the previous embodiments, has a coolant outlet duct 221 which is connected to the inlet of an intermediate heat exchanger 222. A flow meter 223, hot trap 224, a cold trap 225 in parallel with hot trap 224, and a pump 226 are connected to coolant outlet duct 221. The outlet 227 of the intermediate heat exchanger is connected to an expansion tank 228 which in turn is connected through a plurality of heat transformers 229 for use during startup to a parallel pump assembly indicated generally at 230. The pumping assembly 230 consists of E.M. pumps 231, flow meters 232, valves 233 and common flow meter 234, the output of common flow meter 234 being connected to the inlet duct 235 of the reactor 220. Inlet duct 235 is also connected through a normally closed valve 236 to a filling and dumping tank 237, the tank 237 being connected to the storage line 238 and to a coolant storage tank not shown. The intermediate heat exchanger 222 is also connected to a secondary heat exchanger 239 by ducts 240 and 245, the duct 240 having pump 241 in the return duct side. The heat extraction loop consisting of ducts 240 and 245 may utilize a gas or liquid as a heat exchanging medium. The secondary heat exchanger 239 has a water inlet 242 and a steam outlet 243, the latter being connected to the power producing facility, e.g., steam turbine, for example (not shown).

The sodium cooling system of FIGURE 13 operates in the following manner: The entire system is filled with a liquid sodium through storage line 238 and filling tank 237 through valve 236. This is accomplished by providing heating elements in a storage tank (not shown) and by raising the temperature of the environment surrounding the cooling system shown in FIGURE 13 to a temperature above the melting point of sodium. The entire sodium cooling system is preferably flushed with an inert gas for a considerable time prior to the introduction of liquid sodium so that all air and other material which would react with the liquid sodium have been completely removed. The E.M. pumps 231 and 226 are then started and valve 236 is closed. The sodium is circulated within the cooling system for several hours to insure that all gaseous voids within the system have been removed. The heat transformers 229 are then activated while the sodium flow is continued. In this manner the entire system including the reactor is slowly brought to a temperature of about 450° C. To supplement such heating an induction or resistance heater 244 may be added immediately adjacent the reactor vessel.

The cold trap 225 is used only during startup operation and is disconnected from the system when the sodium temperature is raised to the 450° C. value. This trap functions to remove oxygen from the coolant system. The hot trap 224 is utilized during reactor operation and contains a getter material for removing oxygen so that the oxygen content in the sodium will be reduced to less than the order of a few parts per million.

FUEL HANDLING SYSTEM

Figure 14:
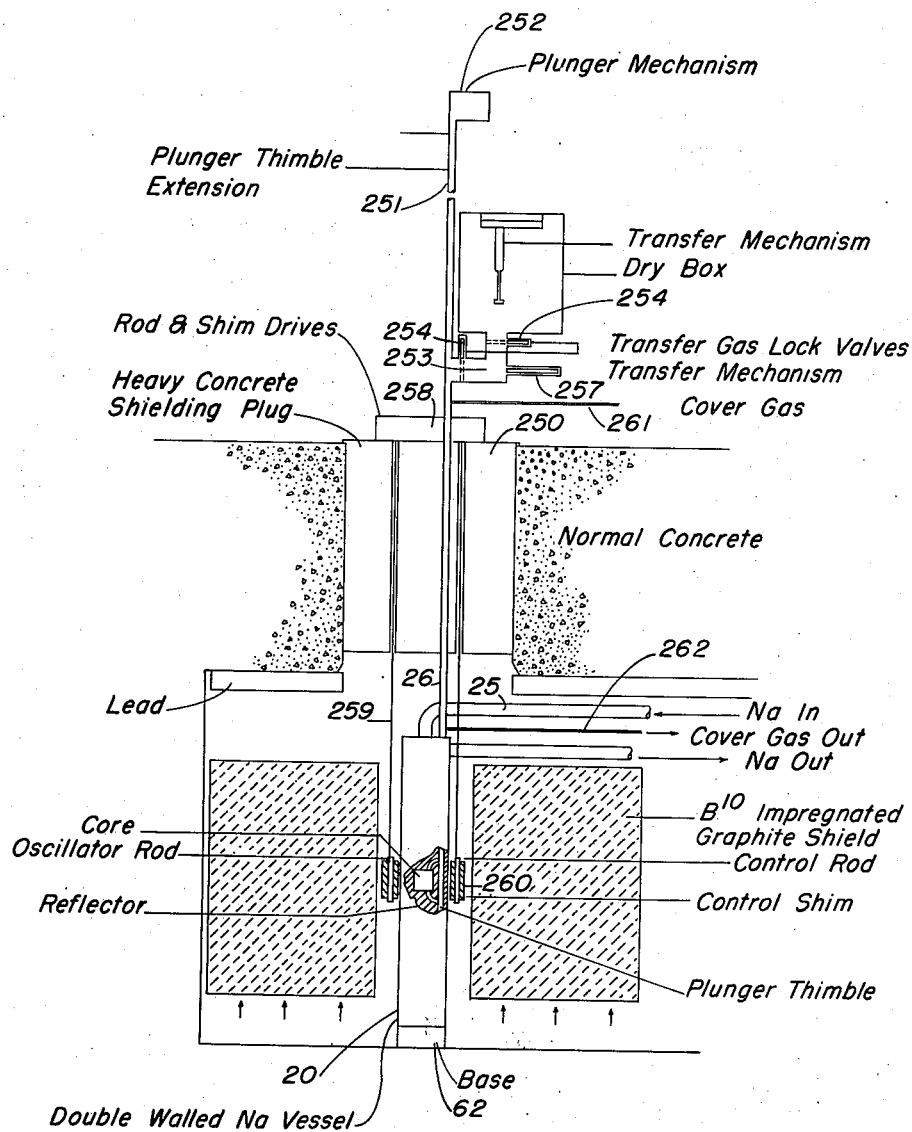
FIGURE 14 is a schematic drawing of the preferred fuel handling system.

A schematic diagram of the fuel handling system of the preferred embodiment is shown in FIGURE 14. Specifically, the pressure vessel 20 is supported on a radial support guide member 62 which constitutes a base for the reactor. Extending upwardly from the top portion of the pressure vessel 20 is the fuel reservoir container 26 which extends through a heavy concrete shielding plug 250 and terminates in a plunger thimble extension 251 which is connected to the plunger mechanism 252. Connected to the fuel reservoir container immediately above the shielding plug 250 is a fuel transfer chamber 253 which has transfer gas lock valves 254, one of these valves shutting off communication between the fuel transfer chamber 253 and the interior of the fuel reservoir container 26 while the other valve shuts off communication between the fuel transfer chamber 253 and a dry box. The dry box contains a transfer mechanism by which solid plutonium containing fuel is moved from an external location into the dry box. The fuel transfer chamber 253 contains a horizontal fuel transfer mechanism 257 which moves solid plutonium from the opening adjacent the dry box through the first transfer lock valve and into the fuel reservoir container 26.

Located immediately above the shield plug 250 are the rod and shim drives 258 which have downwardly extending control members 259 which pass through shield block 250 and are connected to the control rod, the control shim, and the oscillator rod assemblies generally indicated at 260. In this manner the mechanical apparatus and electrical connections for the control rod, shim and oscillator rods are located in a shielded position, so that repairs can be made without exposing personnel to the high radiation levels adjacent the reactor. Substantially surrounding the reactor vessel 20 and external to the control shim 260 is a $B^{10}$ impregnated graphite shield which has cooling air passing upwardly therethrough. It should be noted that a breeding blanket of appropriate material, such as natural uranium, could be substituted for all or a portion of the graphite shield or that a water shield could be used.

The operation of the fuel handling system shown in FIGURE 14 is as follows:

The movable plunger 56 (see FIG. 2) is moved to its upper position which is above the level of the fuel transfer chamber 253. The first lock valve is closed and the transfer mechanism 256 in the dry box moves small solid pieces of the desired reactor fuel, preferably a plutonium iron alloy, and places these solid fuel pieces on the horizontal transfer mechanism 257. The second lock valve 254 is then closed so that the dry box is no longer connected to the fuel transfer chamber 253. The first lock valve 254 is then opened and the transfer mechanism 257 is then actuated so that the fuel piece is moved into the fuel reservoir container 26 where it drops to the bottom. This procedure is followed for a plurality of plutonium containing pieces until a sufficient quantity of plutonium is present within the fuel reservoir container to attain a condition of criticality when introduced into the core. The cooling system of FIGURE 13, which has previously been activated, has heated the reactor assembly to a high temperature, and thus the plutonium containing pieces within the fuel reservoir container 26 will be melted.

It should be noted that a cover gas, for example, argon, is introduced into the fuel handling system through a pipe 261 connected to the fuel reservoir container above the shielding block 250 and has an outlet 262 immediately above the pressure vessel 20. It is apparent that the cover gas will flow downwardly in the fuel reservoir container 26 and outwardly through outlet 262 thereby removing gaseous fission products which will normally accumulate above the plunger 56.

The fuel handling system for the reactor shown in FIGURE 7 may be similar to that shown in FIGURE 14 except that the fuel reservoir container 26 would be located outside of the outer vessel 101 and the fuel inlet pipe 133 and the fuel outlet pipe 134 would be connected to the lower and upper portion respectively of the fuel reservoir container 26.

The fuel handling system for the reactor embodiment having the spiral core as shown in FIGURE 11 has a similar fuel handling system (see FIG. 10) in which the fuel is introduced originally through pipe 188 into the reservoir tanks 166 in a liquid form. The fuel inlet pipe 188 is then used as a duct for a sodium system, for example, in which sodium is introduced into the reservoir tanks 166 thereby forcing the liquid fuel upwardly through pipe 190 into the core cage container 174. The system for originally converting the plutonium containing fuel to liquid form and for handling the plutonium pieces may be similar to that shown in FIGURE 14.

REACTOR FUELS

Figure 15:
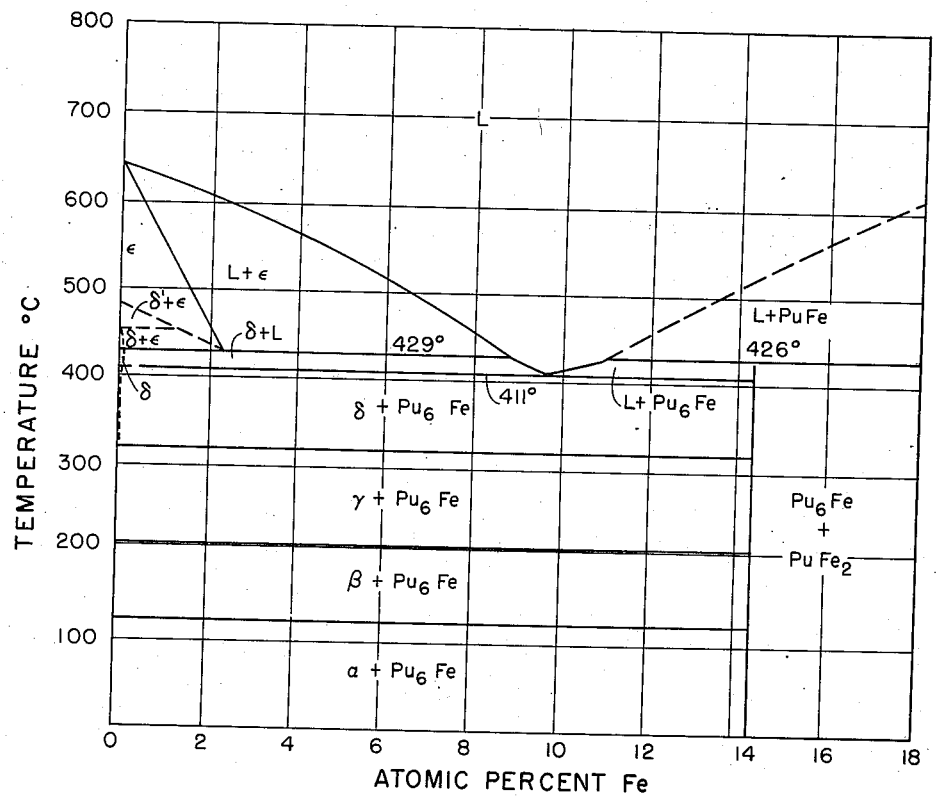
FIGURE 15 is a fuel alloy phase diagram of the preferred fuel.

The reactor fuels for all of the embodiments of the reactor of the present invention preferably consist of a plutonium-iron alloy where the iron is present in the amount of about 9.3 atomic percent. This percentage constitutes a eutectic point in the phase dagram of the plutonium iron system as is shown in FIGURE 15.

Although the embodiments of the present invention described above preferably utilize the above mentioned plutonium-iron alloy, other fuels such as those described in a co-pending application S.N. 523,138, filed July 19, 1955, now Patent No. 2,890,954, entitled "Plutonium Alloys," by William Chynoweth, or other plutonium containing alloys, such as plutonium-bismuth, plutonium-magnesium or ternary alloys containing plutonium which have melting points in the range of the alloys above mentioned, or lower, may be utilized in the reactors of the present invention. Table V shows the pertinent data for some of the fuel alloys which may be used in the reactors of the present invention.

TABLE V

*Fuel Alloys*

| Alloy | Eutectic Composition, Atomic Percent | Melting Point, °C. | Approximate Density, g./cc. |
| --- | --- | --- | --- |
| Pu—Fe | 9.5 Fe | 410 | 16.8 |
| Pu—Co | 10 Co | 405 | 16 |
| Pu—Ni | 12.5 Ni | 465 | 16 |
| Pu—Mg | 85 Mg | 552 | 3.4 |
| Pu—Bi | Non-eutectic | 271–900 | |

As is apparent from FIGURE 15 the preferred fuel is a eutectic and has a melting point of approximately 410° C., which is several hundred degrees lower than the melting point of pure plutonium. Thus, although pure plutonium could be used in the reactors of the present invention, the resulting corrosion problems resulting from the high temperatures necessitated by the use of pure plutonium would require greater use of tantalum and would also require far greater thicknesses in the present components fabricated from tantalum.

Figure 16:
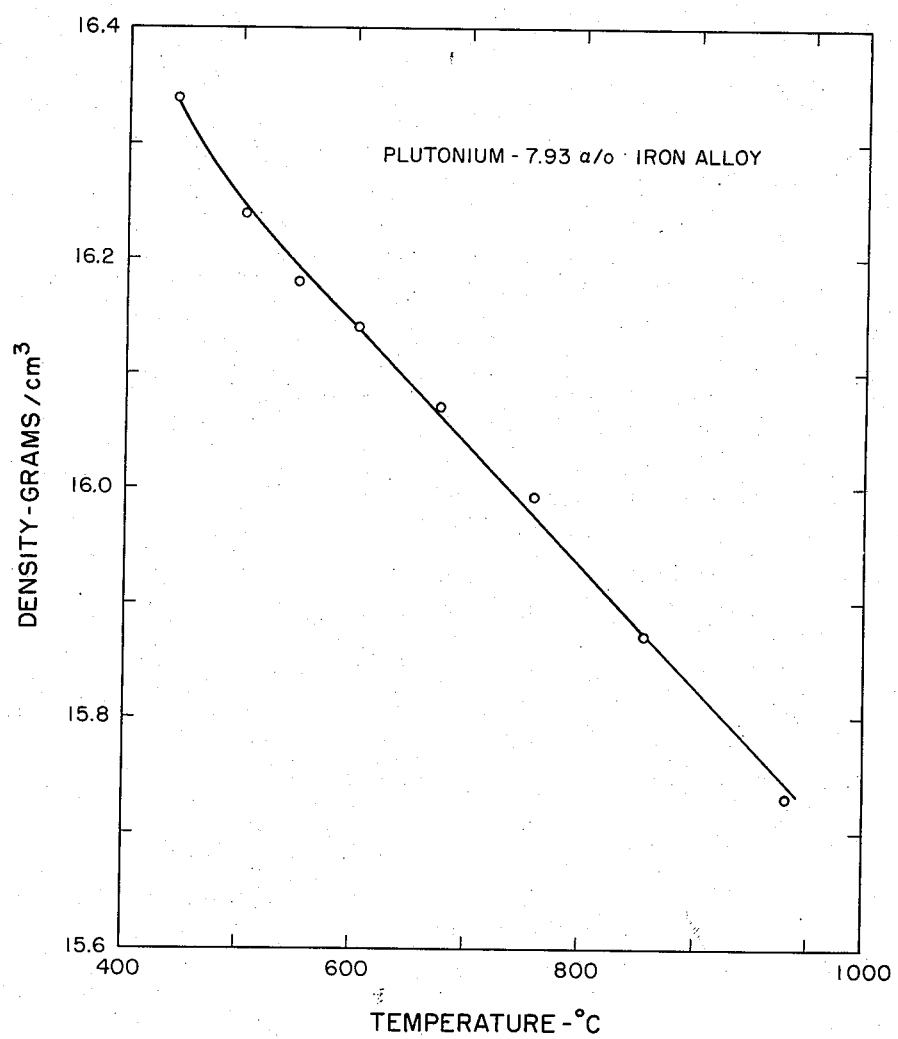
FIGURE 16 is a graph showing the expansion characteristic of the preferred fuel.

In all of these embodiments of the present invention the plutonium fuel is originally made in the form of an alloy having 9 atomic percent iron. The reason for utilizing a 9 atomic percent iron alloy is so that, if during the startup procedures it is found that criticality is reached before the entire core is filled with liquid plutonium, iron can be added which will not increase the melting point of the alloy but will decrease it toward the eutectic point. In this manner the liquid plutonium fuel can be adjusted so that the entire core will be filled with plutonium containing fuel and no gross reactivity changes will take place during operation due to expansion of the fuel within the critical core region. For example, the expansion characteristics of a plutonium iron alloy are shown in FIGURE 16 where the alloy consists of 7.93 atomic percent iron and the balance plutonium. As is apparent from the graph in FIGURE 16, an increase in temperature from about 450° C. to an operating temperature in the neighborhood of 650° C. results in an expansion of several percent. The expansion characteristics of plutonium iron alloys having about 9 atomic percent iron are very similar to that shown in FIGURE 16. Thus, it is apparent that during the initial startup procedure where the temperature is raised from about 450 to about 650° C. provision must be made to accommodate the expanding plutonium containing fuel. Such expansion is accommodated by the upper peripheral volume 80 shown in FIGURE 4. As is also apparent from FIGURE 16, the volumetric expansion coefficient in the liquid phase would be about $.75 \times 10^{-4}/°$ C., which will give a highly desirable strong negative temperature coefficient of reactivity over the complete operating range.

CORE CONFIGURATIONS

The core of the reactor consists generally of four basic constituents:

(1) A cylindrical tantalum vessel
(2) A tantalum tube heat exchanger
(3) A molten plutonium alloy fuel
(4) Sodium as the coolant Three types of heat exchangers have been disclosed, namely, (1) a calandria or straight through arrangement with vertical tubes welded into the top and bottom, (2) a bayonet with thimble or re-entrant tubes welded only into a cover plate, and (3) a spiral coil around which the coolant flows. The calandria offers the advantage of a smaller pressure drop and simpler manifolding is required to provide proper cooling in the core and reflector. Coolant would flow in at the bottom and out the top with parallel flow within the side reflector and central region. However, this straight through or calandria type arrangement has the disadvantage that thermal stresses in the top and bottom plate, due to the expansion of the tubes, requires heavy tantalum supports so that no structural failure, due to expansion, can take place.

The bayonet type design of the preferred embodiment offers several advantages over the calandria type. The tube sheet stresses are reduced, since there is only lateral restraint at the bottom of the thimbles. The fuel container is simplified, since the bottom of the container is not used as a tube sheet and thus the number of tube welds for a specified number of tubes is reduced by a factor of 2. The second tube sheet, i.e., the re-entrant tube support, holds the sodium inlet squirt-tubes or re-entrant tubes and is quite independent of the fuel container. This tube support is also made of tantalum in order to maintain the same relative spacing between the thimbles and re-entrant tubes. However, the re-entrant tubes could be made of stainless steel. It should be noted that there is no requirement that small leaks between inlet and outlet sodium streams be avoided since this will not have any effect on heat removal efficiency. An additional advantage of the bayonet type construction of the preferred embodiment is that thermal shock is reduced. Since the inlet sodium stream passes in through the inlet tubes and out the annulus between these tubes and the thimbles, considerable preheating of the inlet sodium occurs before contacting the tantalum-fuel interfaces. The thimble tube sheet is furthermore maintained at a uniform temperature since it is covered by the core outlet coolant stream. Maximum thermal shocks and stresses are removed to the secondary tube sheet where minor leakage is unimportant.

The spiral fuel tube arrangement combines the advantages of straight through sodium flow, minimized thermal stresses, and minimized number of welds. Also the surface to volume ratio can be adjusted at will, and is significantly greater than for either the bayonet or straight-through types.

The critical mass determinations are made either experimentally or theoretically. For methods and means for determining the critical mass experimentally, see Los Alamos Reports, LA-2142, declassified August 13, 1957, entitled "Preliminary Critical Experiments on a Mock-Up of the Los Alamos Molten Plutonium Reactor," by R. M. Kiehn et al., and an "Introduction to Fast Reactors," by R. M. Kiehn, identified as K-1-706, declassified April 11, 1957, and "Some Applications of the $S_n$ Method" by R. M. Kiehn (K-1-3049), the disclosures of which are incorporated herein by reference. Following the teachings of these reports and using the information contained therein, the determination of critical mass for various size reactor cores as well as various fuel dilutions is a matter of skill of the art and therefore no detailed explanation is included herein.

Table VI shows the effect of coolant tube size on some of the core cage characteristics. The values tabulated are for a core cage with the following specifications: 16.2 g./cc. density of $Pu_{.9}Fe_{.1}$ alloy fuel (50% core volume), 6 in. height, 6 in. diameter, 1 mw. power, 500° C. sodium coolant inlet temperature and 600° C. sodium outlet temperature.

TABLE VI

| | | | | | | |
|---|---|---|---|---|---|---|
| Ta coolant tube O.D. (in.) | 3/16 | 1/4 | 5/16 | 5/16 | 3/8 | 1/2 |
| Ta coolant tube I.D. (in.) | .158 | .220 | .282 | .282 | .345 | .470 |
| Number tubes in core | 507 | 286 | 184 | 169 | 128 | 72 |
| Spacing between tube centers (in.) | .253 | .337 | .420 | 1.395 | .505 | .673 |
| Gap (ligament) between tubes (in.) | .065 | .087 | .108 | 1.083 | .130 | .173 |
| Heat flux (watts/cm.²) | 94 | 123 | 150 | 163 | 180 | 237 |
| Temperature across Ta wall (° C.) | 5.9 | 7.7 | 9.5 | 10.3 | 11.3 | 14.9 |
| Thermal hoop stress, Ta (p.s.i.) | 770 | 1,030 | 1,250 | 1,360 | 1,500 | 1,970 |
| Temperature rise within fuel (° C.) | 26 | 45 | 70 | 70 | 103 | 181 |
| Squirt-tube O.D. (in.) | .123 | .172 | .220 | .220 | .273 | .367 |
| Squirt-tube wall (in.) | .011 | .016 | .020 | .020 | .024 | .035 |
| Squirt-tube I.D. (in.) | .101 | .140 | .180 | .181 | .222 | .297 |
| Na annular thickness (in.) | .018 | .024 | .031 | .031 | .038 | .052 |
| Hottest Na temperature (° C.) | 675 | 670 | 624 | 624 | 605 | 600 |
| Hottest Na temperature (° C.) | 688 | 625 | 603 | 603 | 600 | 600 |
| Na velocity (ft./sec.) | 12.2 | 11.4 | 10.6 | 11.5 | 10.4 | 9.9 |

¹ Minimum distance, dimension variable.

The first 9 items are applicable to either calandria, once-through, coolant flow or for the thimbles of the bayonet design coolant flow. The heat flux through the Ta wall is figured at the mean diameter and the heat conductivity of the fuel alloy is taken as 0.037 cal./sec.-cm. ° C. Items 10–16 apply only to the bayonet design coolant flow. The re-entrant or squirt-tube diameter is chosen to make the inside diameter and the annulus have equal areas.

COOLANT

The primary coolant is preferably sodium although a NaK system could also be utilized. The loop and reactor wall are constructed of stainless steel, type ELC. Such stainless steel is a good material for containing sodium in the operating temperature ranges, i.e., up to temperatures, for example, of about 800° C.

Sodium is advantageous because of its low melting point, good heat transfer characteristics, and low pumping power requirements, but has the disadvantage of its explosive burning property when exposed to water or moist air.

Bismuth may also be used as a coolant in the reactors of the present invention. Bismuth, although obviating the difficulties encountered in using sodium, has the disadvantage that it has a higher melting point, the power requirements for pumping are about five times as large as for sodium and polonium builds up in the system.

REFLECTOR

Armco iron is utilized as the reflector material in a preferred embodiment since it is highly corrosion resistant to hot sodium and it provides a suitable material for low frequency induction heating to bring the core components above the melting point of sodium. The thickness of the radial reflector is adjusted to permit the maximum external reflector control obtainable without permitting reflected thermalized neutrons to build up a power spike at the core surface. About ⅔" of iron is satisfactory for this purpose.

SAFETY CIRCUITS

The control rods are enriched boron rods which move vertically within the control rod tubes 66. The reflector shim 65 is also vertically movable. The mechanism for moving the control rods and shim are similar to those of the prior art, see "Principles of Nuclear Engineering," Samuel Glasstone, chapter VI (Van Nostrand & Co., 1955). In general the control rods are moved to their vertical tubes by two-phase, two pole induction motors. The motors are controlled by level switches. The shim is attached to the vertical movement mechanism through D.-C. lifting magnets which are de-energized during a "scram" to allow the shim to fall freely away from its normal operating position adjacent the core.

Any leaks in the inner vessel, above normal activity in the steam line, heat exchangers, coolant system, excessive fuel temperatures, or coolant pump failure will automatically result in insertion of the control rods and/or dropping of the reflector shim.

The above described components and circuits are well-known in the art and are therefore not illustrated or described in detail herein.

OPERATION

The operation of the preferred embodiment of FIGURES 1–6 only is described herein in detail, since modifications of this operating procedure for the other embodiments will be apparent from this description.

The cooling system is chemically cleaned and flushed with an inert gas. The sodium is then heated in a storage container (not shown) and the environment of the reactor and cooling system brought to a temperature in excess of the melting point of sodium by passing heated air, for example, over the entire system for several hours.

When the entire system has reached a temperature of about 100° C., the sodium from the storage tanks (not shown) is pumped through storage line 238 of FIGURE 13 into filling tank 237. Valve 236 is opened and the entire cooling system of FIGURE 13 is filled with sodium at a temperature of about 100° C. Pumps 226 and 231 are started and the sodium is circulated through the reactor 220 and associated coolant system. The heating transformers 229 are activated and the temperature of the sodium is slowly raised to about 600° C. The system is run at this temperature for several days to clean the tantalum and lower its oxygen content to a value in equilibrium with hot trapped sodium.

During the latter portion of the high temperature coolant circulation cycle, the core and entire fuel system is evacuated in order to out-gas the fuel system component material. The system may be flushed with an inert gas such as helium to insure that the fuel containing system has a very low oxygen content. Extra care must be taken in this procedure since the plutonium containing fuel will be operating at temperatures in excess of 500° C., and at such temperatures contaminants, e.g., oxygen will be easily picked up by the molten fuel.

The fuel loading operation can now be started. The movable plunger 56 (see FIG. 2) is moved to its upper position, i.e., above the level of the fuel transfer chamber 253 (see FIG. 14). The first lock valve is closed and the transfer mechanism 256 in the dry box moves small solid pieces of the desired reactor fuel, preferably a plutonium iron alloy, and places these solid fuel pieces on the horizontal transfer mechanism 257. The second lock valve 254 is then closed so that the dry box is no longer connected to the fuel transfer chamber 253. The first lock valve 254 is then opened and the transfer mechanism 257 is then actuated so that the fuel piece is moved into the fuel reservoir container 26 where it drops to the bottom. This procedure is followed for a plurality of plutonium containing pieces until a sufficient quantity of plutonium is present within the fuel reservoir container to attain a condition of criticality when introduced into the core.

The fuel is then slowly added to the core by means of the positive displacement plunger 56 while observations and measurements are made on neutron multiplication. The core fuel may then be drained into the reservoir and additional plutonium or iron added so that a condition of criticality is reached when the molten fuel level is slightly above the top of the core cage. The neutron multiplication measurements are normally made with the control shim slightly below a position immediately adjacent the core and with the control rods partially out. In this manner the shim can be moved into the adjacent position to increase criticality if desired at a later time, and the control rods can be inserted to decrease reactivity during operation.

When the molten plutonium containing fuel has a level slightly above the flange 82 in the volume 80 for a condition of just critical, power operation may be started. Such operation is begun by turning off the heating transformers 229 (see FIG. 13) thereby relying on the reactor to maintain the temperature of the coolant. The pump in the intermediate heat exchanger is started and water is pumped through the secondary heat exchanger 239. The pumping rates are increased until the full one megawatt of heat is being extracted from the reactor of the preferred embodiment.

Thus it is apparent that the reactors of the present invention have a novel arrangement and association of components which result in the effective use of a molten plutonium-containing fuel in a fast neutron, chain reacting, plutonium breeding system. Further, by utilizing the fuel-coolant systems of the present invention, neutron fluxes, power outputs and power densities considerably greater than those of fast reactors of the prior art are obtained.

Although preferred embodiments of the present invention have been described, it is apparent that various modifications may be made without departing from the scope of the invention. Therefore the present invention is not limited by the foregoing description of the various embodiments but only by the appended claims.

What is claimed is:

1. A fast neutron breeder reactor comprising in combination a vessel;

a core container defining a closed volume;

a quantity of a molten, predominantly plutonium fuel in said closed volume, all parts of said fuel being in contact with all other parts of said fuel, said quantity of fuel being essentially completely free of nonmetallic diluents, having a melting point not exceeding that of pure plutonium, and containing sufficient plutonium to sustain a condition of neutronic criticality in said closed volume;

a single conduit means for adding fuel to the entire core; a single conduit means for withdrawing fuel from the entire core;

thermally conductive wall means defining a multiplicity of coolant channels extending through said core container and said fuel in said closed volume, said thermally conductive wall means also defining the portion of said closed volume occupied by said fuel and separating said fuel from said coolant channels;

means including a circulating coolant in said coolant channels for removing heat from said fuel by means of heat exchangers located outside of said reactor;

means for controlling the reactivity of said quantity of fuel in said closed volume, and means separate from said coolent substantially surrounding said core container for breeding plutonium.

2. The fast neutron breeder reactor of claim 1 wherein said thermally conducting wall means consists of a spiral tube fuel container having both ends open and extending through the walls of said core container, one of said ends being connected to said single conduit means for adding fuel and the other of said ends being connected to said single conduit means for withdrawing fuel.

3. The fast breeder reactor of claim 1 including means connected to the bottom of said core container for draining said molten fuel from said core container.

4. The fast breeder reactor of claim 1 including means connected to the top of said core container for removing at least a portion of the fission products from said molten fuel.

5. The fast breeder reactor of claim 1 including means connected to the top of said core container for removing at least a portion of the fission products from said molten fuel, said means including a fission product scavenging fluid in contact with a portion of said molten fuel.

6. The homogeneous fast breeder reactor of claim 1 including fuel handling means comprising at least one liquid fuel reservoir tank, a first conduit connecting said reservoir tank to said core container, a settling tank located above said core container, a branch pipe connecting said first conduit with said settling tank, a circulating pipe connecting said core container and said settling tank, a scavenging fluid reservoir located above said core container, a first pipe connecting the top of said settling tank to the upper portion of said scavenging fluid reservoir tank, a second pipe connecting said scavenging fluid reservoir tank to said circulating pipe at a point immediately above said core container whereby said scavenging fluid may be introduced into said circulating pipe where it bubbles up through said circulating pipe, which contains an amount of said plutonium alloy fuel, into said settling tank where the plutonium-containing fuel settles to the botom and where the scavenging fluid and any removed fission products flow through said first pipe into the scavenging fluid reservoir tank, and a second conduit connecting the top of said liquid fuel reservoir tank to a source of sodium for forcing liquid fuel from said liquid fuel reservoir tank into said core container.

7. The homogeneous fast breeder reactor of claim 6 including means for heating said fuel to a molten condition.

8. A homogeneous fast neutron breeder reactor comprising in combination a vessel, a closed core tantalum container supported within said vessel and in spaced relation thereto, fast neutron reflective means substantially surrounding said core container, coolant channels in said reflective means, said core container having a plurality of tubes extending therethrough with both ends open and extending through the walls of said core container, a quantity of molten, predominantly plutonium fuel in said core container in conductive contact with the outside surfaces of said tubes, all parts of said fuel being in contact with all other parts of said fuel, said quantity of molten fuel in said core container having a melting point not exceeding that of pure plutonium, being essentially completely free of non-metallic diluents and containing sufficient plutonium to sustain a condition of nuclear criticality, a single conduit means for adding fuel to the entire core, a single conduit means for withdrawing fuel from the entire core, a coolant, means for moving said coolant through said coolant channels in said reflective means and through said tubes in said core container, means external to said vessel for removing heat from said coolant, means adjacent said core container for controlling the reactivity of said fuel in said core container, and means separate from said coolant substantially surrounding said core container for breeding plutonium.

9. A fast neutron breeder reactor comprising in combination a vessel, a core cage assembly supported within said vessel, said core cage assembly consisting of a closed container, a plurality of first tubes supported in said container and extending downwardly therein to substantially the bottom thereof, said tubes having their lower ends closed and their upper ends open and extending through the top of said core container, said tubes being spaced from each other to define a plurality of interconnected interstices sealed from the interiors of said tubes, a plurality of second tubes having both ends open extending into said closed-end tubes for substantially the full length thereof but terminating above the bottoms thereof, one said second tube extending co-axially into each said closed-end tube to define a downwardly extending central coolant passage and an upwardly extending annular coolant passage, a coolant, means for passing said coolant through said central coolant passages and said annular coolant passages, a quantity of molten, predominantly plutonium fuel, said fuel having a melting point not greater than that of pure plutonium and being essentially completely free of non-metallic diluents, means for injecting at least a portion of said fuel into the volume in said core container within the interstices of said tubes, said portion in said core container having a sufficient quantity of plutonium to sustain a condition of neutronic criticality, means adjacent said core container for controlling the reactivity of said fuel in said core container, and means substantially surrounding said core cage assembly for breeding plutonium.

10. The fast breeder reactor of claim 9 including means connected to the bottom of said core container for draining said molten fuel from said core container, and means connected to the top of said core container for removing at least a portion of the fission products from said fuel.

11. The fast breeder reactor of claim 9 including means connected to the bottom of said core container for draining said molten fuel from said core container, and means connected to the top of said core container for removing at least a portion of the fission products from said fuel, said last named means including a fission product scavenging fluid in contact with a portion of said molten fuel.

12. The fast breeder reactor of claim 9 wherein said first named means includes a non-critical reservoir located external to said core cage assembly, said reservoir being connected to the bottom and the top of said core container, a quantity of said predominantly plutonium fuel in said reservoir, means for heating said fuel to a molten condition, and positive displacement means for forcing molten fuel into said spiral tube.

References Cited in the file of this patent

UNITED STATES PATENTS

| | | |
|---|---|---|
| 526,208 | Wheeler | Sept. 18, 1894 |
| 2,812,303 | Daniels | Nov. 5, 1957 |
| 2,815,319 | Snell | Dec. 3, 1957 |
| 2,865,827 | Dwyer | Dec. 23, 1958 |
| 2,890,954 | Chynoweth | Jan. 16, 1959 |
| 2,910,417 | Teitel | Oct. 27, 1959 |

OTHER REFERENCES

AECD-3059, Jan. 25, 1951, Technical Information Service, Oak Ridge, Tenn., pp. 1-21.

Grebe: Nucleonics, vol. No. 12, February 1954, pp. 13-15.

Davis: Industrial Applications of Atomic Power, December 1955, page 11, USAEC release.

Nucleonics, vol. 14, No. 4, April 1956, pages 72-77, article by Teitel.

Proceedings of the International Conference on the Peaceful Uses of Atomic Energy, Geneva, Aug. 8-20, 1955, United Nations, New York (1956), pages 345, 437, 443 and 444.

Lampre: A Molten Plutonium Fueled Reactor Concept (LA-2112), January 1957, pages 1 to 14, USAEC document.